(12) United States Patent
Liang et al.

(10) Patent No.: US 9,696,520 B2
(45) Date of Patent: Jul. 4, 2017

(54) WIDE-ANGLE LENS

(71) Applicants: Sintai Optical (Shenzhen) Co., Ltd., Shenzhen, Guandong Province (CN); AO Ether Corporation, Taichung (TW)

(72) Inventors: Yuan-Fan Liang, Taichung (TW); Tsan-Haw Lee, Taichung (TW)

(73) Assignees: SINTAI OPTICAL (SHENZHEN) CO., LTD., Shenzhen, Guangdong Province (CN); AO ETHER CORPORATION, Taichung (TW)

( * ) Notice: Subject to any disclaimer, the term of this patent is extended or adjusted under 35 U.S.C. 154(b) by 0 days.

(21) Appl. No.: 14/875,835

(22) Filed: Oct. 6, 2015

(65) Prior Publication Data

US 2016/0103301 A1 Apr. 14, 2016

(30) Foreign Application Priority Data

Oct. 9, 2014 (TW) ................................ 103135224

(51) Int. Cl.
*G02B 3/02* (2006.01)
*G02B 13/00* (2006.01)
*G02B 13/04* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 13/006* (2013.01); *G02B 13/04* (2013.01); *G02B 27/0025* (2013.01)

(58) Field of Classification Search
CPC .................................................. G02B 13/0045
USPC ......................................................... 359/708
See application file for complete search history.

(56) References Cited

U.S. PATENT DOCUMENTS

| | | | |
|---|---|---|---|
| 2002/0176177 A1* | 11/2002 | Takatsuki ............. | G02B 15/177 359/691 |
| 2004/0136088 A1 | 7/2004 | Ohashi | |
| 2005/0094285 A1 | 5/2005 | Ohashi et al. | |
| 2006/0176576 A1* | 8/2006 | Nagahara ............... | G02B 13/16 359/680 |
| 2010/0196003 A1 | 8/2010 | Miyazaki et al. | |
| 2011/0026132 A1 | 2/2011 | Sado | |
| 2014/0055659 A1 | 2/2014 | Iwamoto | |

* cited by examiner

*Primary Examiner* — James Jones
(74) *Attorney, Agent, or Firm* — McClure, Qualey & Rodack, LLP

(57) ABSTRACT

A wide-angle lens, from an object side to an image side along an optical axis, includes a first lens, a second lens, a third lens, a fourth lens, a fifth lens, a sixth lens, a seventh lens, an eighth lens and a ninth lens. The first, second and third lens are with negative refractive power. The fourth, fifth, sixth and seventh lens are with refractive power. The eighth lens is a biconvex lens with positive refractive power. The ninth lens is a biconvex lens with positive refractive power. The first lens, the second lens and the third lens satisfy: $-26<f_1/f<f_2/f<f_3/f<-3$ and $-1.64<f_{123}/f<-1.6$ wherein $f_1$ and $f_2$ are effective focal lengths of the first and second lenses, $f_3$ and $f$ are an effective focal lengths of the third lens and the wide-angle lens, and $f_{123}$ is an effective focal length of the combination of the first lens, second lens and third lens.

20 Claims, 24 Drawing Sheets

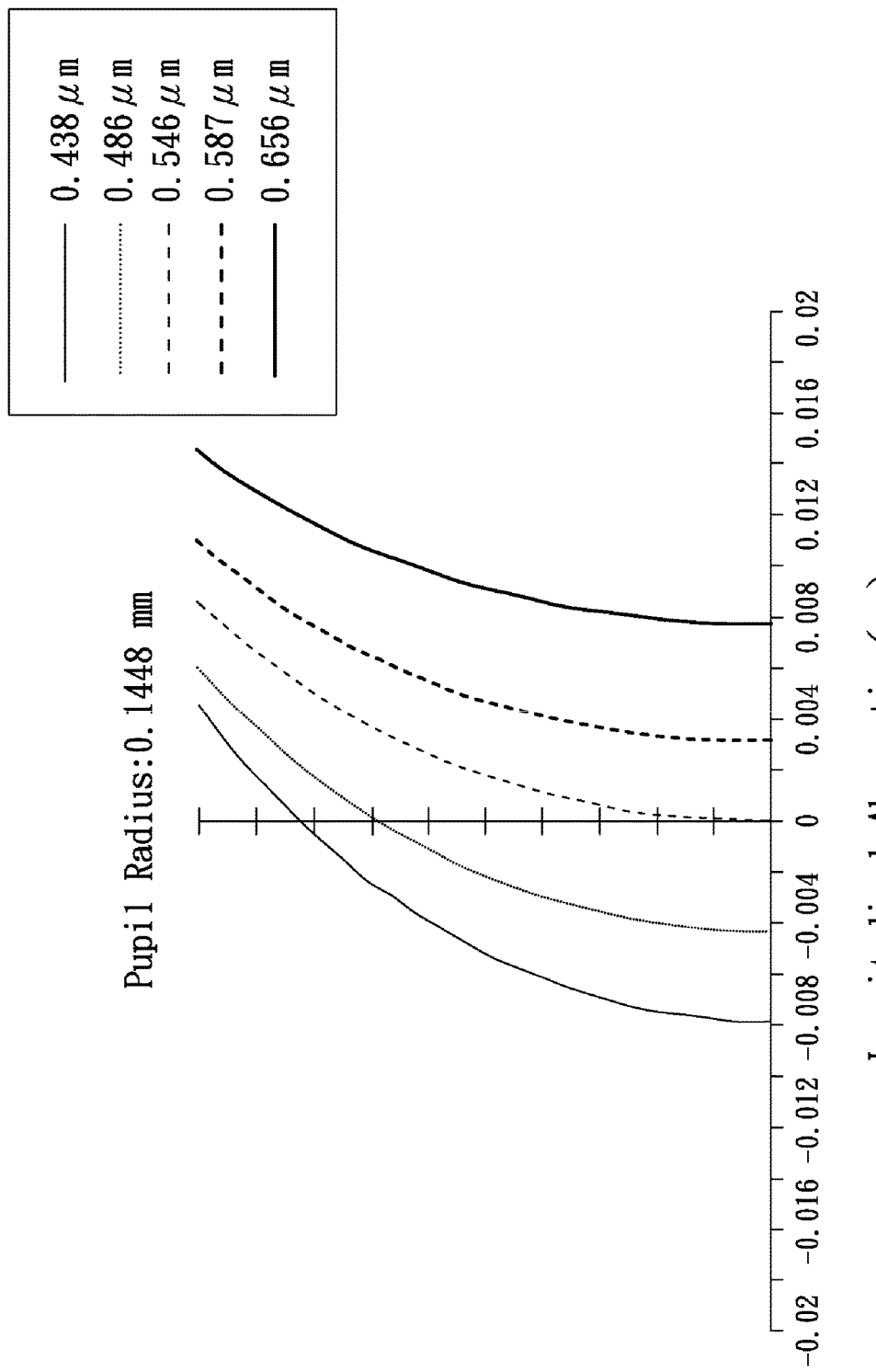

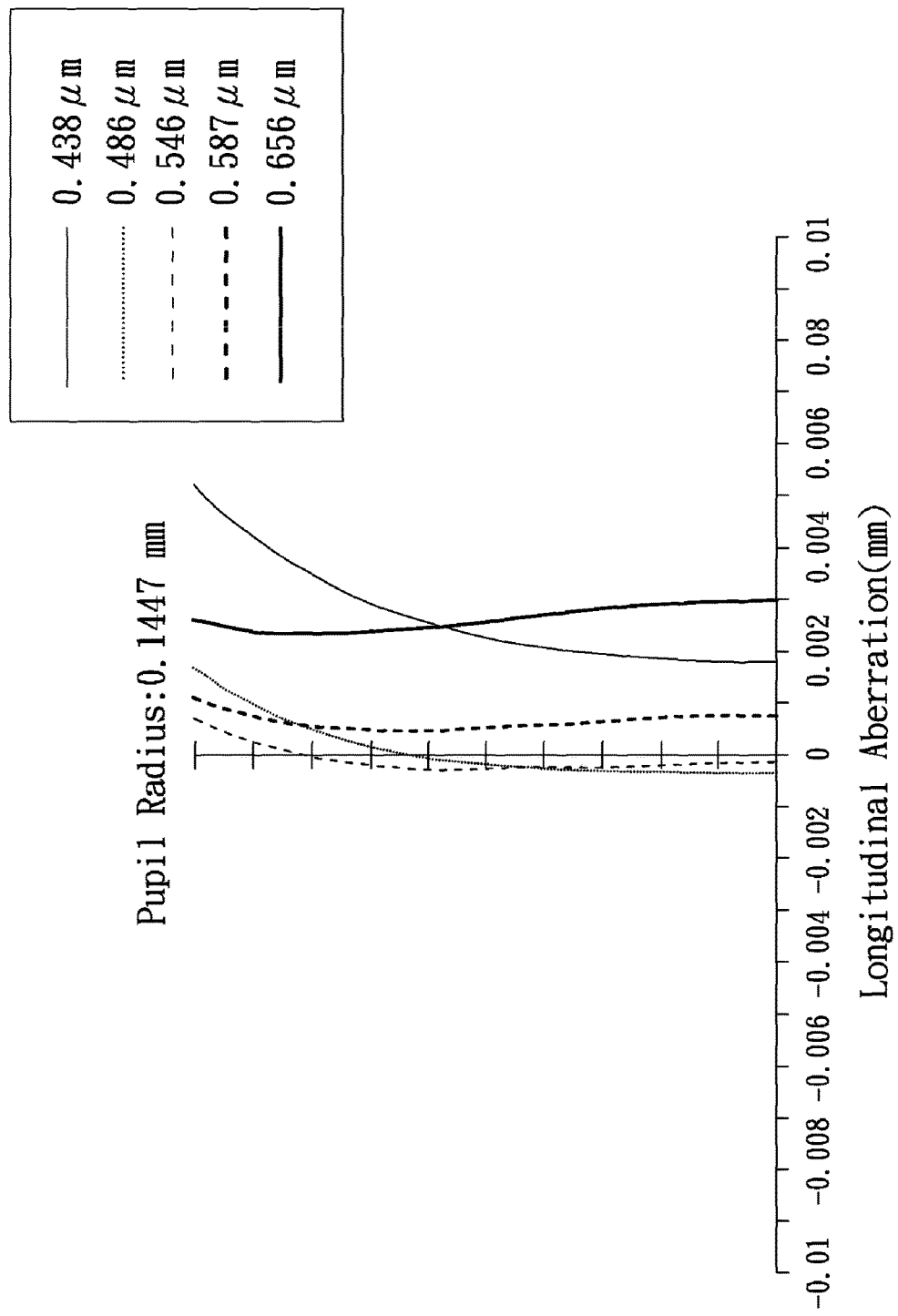

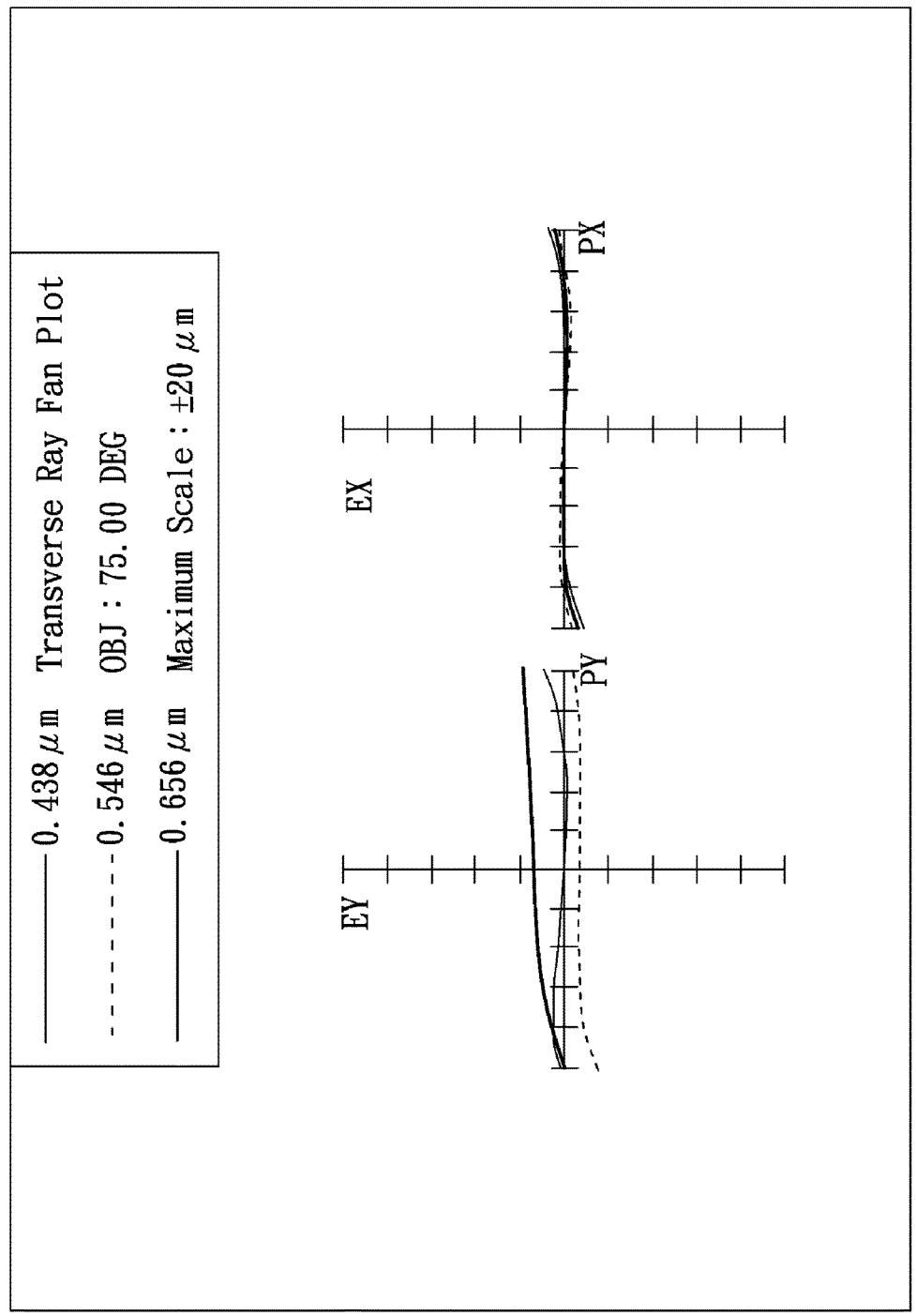

WIDE-ANGLE LENS

BACKGROUND OF THE INVENTION

Field of the Invention

The invention relates to a lens, and more particularly to a wide-angle lens.

Description of the Related Art

In recent years, the requirements for camera with wide field of view are greatly increased due to the rise of the sports market. Lens assemblies that are used for such kind of cameras have been developed toward wide field of view and miniaturization in order to capture a wider range of images and carry conveniently. Therefore, the requirements for lens assemblies with wide field of view and miniaturization are greatly increased. However, the known wide-angle lens can't satisfy such requirements. Therefore, a wide-angle lens with new structure to meet the requirements of wide field of view and miniaturization is needed.

BRIEF SUMMARY OF THE INVENTION

The invention provides a wide-angle lens to solve the above problems. The wide-angle lens of the invention is provided with characteristics of a shortened total lens length, a wider field of view and still has a good optical performance.

The wide-angle lens in accordance with an exemplary embodiment of the invention, from an object side to an image side along an optical axis, includes a first lens, a second lens, a third lens, a fourth lens, a fifth lens, a sixth lens, a seventh lens, an eighth lens and a ninth lens. The first, second and third lens are with negative refractive power. The fourth, fifth, sixth and seventh lens are with refractive power. The eighth lens is a biconvex lens with positive refractive power. The ninth lens is a biconvex lens with positive refractive power. The first lens, the second lens and the third lens satisfy $-26 < f_1/f < f_2/f < f_3/f < -3$ and $-1.64 < f_{123}/f < -1.6$, wherein $f_1$ is an effective focal length of the first lens, $f_2$ is an effective focal length of the second lens, $f_3$ is an effective focal length of the third lens, f is an effective focal length of the wide-angle lens, and $f_{123}$ is an effective focal length of the combination of the first lens, the second lens and the third lens.

In another exemplary embodiment, the eighth lens and the ninth lens satisfy $30 < D/D_{89} < 271$, wherein D is an interval between an object side surface of the first lens and an image plane along the optical axis, and $D_{89}$ is an interval between an image side surface of the eighth lens and an object side surface of the ninth lens along the optical axis.

In yet another exemplary embodiment, the fourth lens satisfies $-226 < R_{41}/f < 19$, wherein $R_{41}$ is a radius of curvature of an object side surface of the fourth lens and f is an effective focal length of the wide-angle lens.

In another exemplary embodiment, the sixth lens satisfies $-63 < R_{61}/f < 7$, wherein $R_{61}$ is a radius of curvature of an object side surface of the sixth lens and f is an effective focal length of the wide-angle lens.

In yet another exemplary embodiment, the ninth lens satisfies $4.2 < f_9/f < 5.6$, wherein $f_9$ is an effective focal length of the ninth lens and f is an effective focal length of the wide-angle lens.

In another exemplary embodiment, the fifth lens, the sixth lens, the seventh lens and the eighth lens satisfy $-16 < f_{78}/f_{56} < 254$, wherein $f_{78}$ is an effective focal length of the combination of the seventh lens and the eighth lens, and $f_{56}$ is an effective focal length of the combination of the fifth lens and the sixth lens.

In yet another exemplary embodiment, the wide-angle lens satisfies $-0.7 < f_{6789}/f_{12345} < 0.8$, wherein $f_{12345}$ is an effective focal length of the combination of the first lens, the second lens, the third lens, the fourth lens and the fifth lens, and $f_{6789}$ is an effective focal length of the combination of the sixth lens, the seventh lens, the eighth lens and the ninth lens.

In another exemplary embodiment, the fourth lens and the fifth lens form a first cemented lens, and the sixth lens and the seventh lens form a second cemented lens.

In yet another exemplary embodiment, the wide-angle lens further includes an aperture disposed between the fifth lens and the sixth lens.

In another exemplary embodiment, the wide-angle lens further includes an aperture disposed between the fourth lens and the seventh lens.

In yet another exemplary embodiment, the fourth lens is with negative refractive power, the fifth lens is with positive refractive power, the sixth lens is with positive refractive power and the seventh lens is with negative refractive power.

In another exemplary embodiment, at least one surface of the second lens is an aspheric surface.

In yet another exemplary embodiment, at least one surface of the third lens is an aspheric surface.

In another exemplary embodiment, at least one surface of the ninth lens is an aspheric surface.

In yet another exemplary embodiment, the second lens is made of glass material.

In another exemplary embodiment, the third lens is made of glass material.

In yet another exemplary embodiment, the ninth lens is made of glass material.

In another exemplary embodiment, the wide-angle lens further includes an optical filter disposed between the ninth lens and an image plane.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4A depicts a longitudinal aberration diagram of the wide-angle lens assembly in accordance with the second embodiment of the invention;

FIG. 6A depicts a longitudinal aberration diagram of the wide-angle lens assembly in accordance with the third embodiment of the invention;

FIGS. 6E-6G are transverse ray fan diagrams of the wide-angle lens in accordance with the third embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
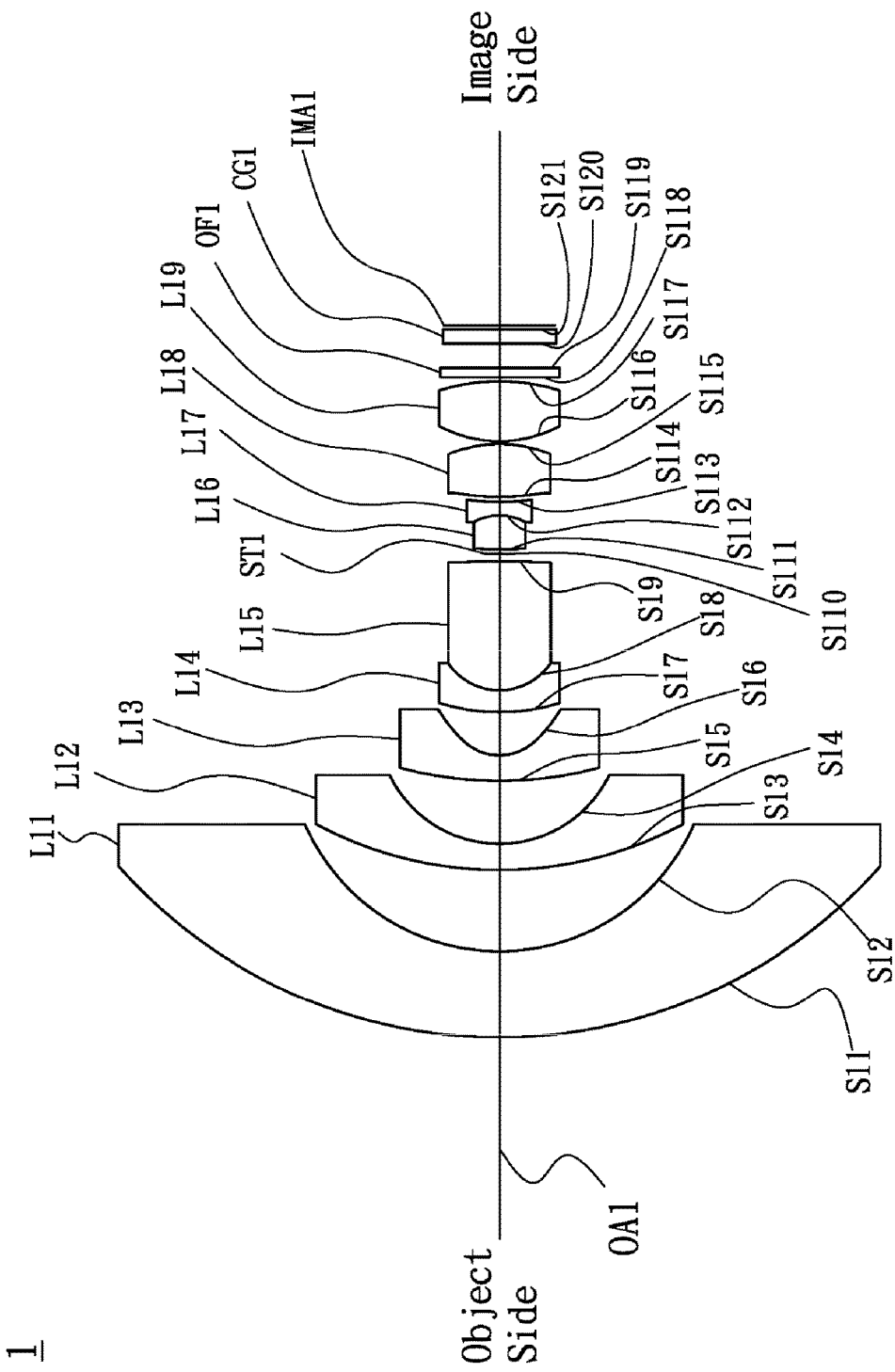
FIG. 1 is a lens layout diagram of a wide-angle lens in accordance with a first embodiment of the invention.

Referring to FIG. 1, FIG. 1 is a lens layout diagram of a wide-angle lens in accordance with a first embodiment of the invention. The wide-angle lens 1, from an object side to an image side along an optical axis OA1, includes a first lens L11, a second lens L12, a third lens L13, a fourth lens L14, a fifth lens L15, an aperture ST1, a sixth lens L16, a seventh lens L17, an eighth lens L18, a ninth lens L19, an optical filter OF1 and a cover glass CG1. In operation, an image of light rays from the object side is formed at an image plane IMA1. The first lens L11 is a meniscus lens, made of glass material and with negative refractive power, wherein the object side surface S11 is a convex surface, the image side surface S12 is a concave surface and both of the object side surface S11 and image side surface S12 are spherical surfaces. The second lens L12 is a meniscus lens, made of glass material and with negative refractive power, wherein the object side surface S13 is a convex surface, the image side surface S14 is a concave surface and both of the object side surface S13 and image side surface S14 are spherical surfaces. The third lens L13 is a meniscus lens, made of glass material and with negative refractive power, wherein the object side surface S15 is a convex surface, the image side surface S16 is a concave surface and both of the object side surface S15 and image side surface S16 are aspheric surfaces. The fourth lens L14 is a meniscus lens and made of glass material, wherein the object side surface S17 is a convex surface, the image side surface S18 is a concave surface and both of the object side surface S17 and image side surface S18 are spherical surfaces. The fifth lens L15 is a biconvex lens and made of glass material, wherein both of the object side surface S18 and image side surface S19 are spherical surfaces. The sixth lens L16 is a biconvex lens and made of glass material, wherein both of the object side surface S111 and image side surface S112 are spherical surfaces. The seventh lens L17 is a biconcave lens and made of glass material, wherein both of the object side surface S112 and image side surface S113 are spherical surfaces. The eighth lens L18 is a biconvex lens and made of glass material, wherein both of the object side surface S114 and image side surface S115 are spherical surfaces. The ninth lens L19 is a biconvex lens and made of glass material, wherein both of the object side surface S116 and image side surface S117 are aspheric surfaces. The fourth lens L14 and the fifth lens L15 are cemented together to form a cemented lens. The sixth lens L16 and the seventh lens L17 are cemented together to form a cemented lens. Both of the object side surface S118 and image side surface S119 of the optical filter OF1 are plane surfaces. Both of the object side surface S120 and image side surface S121 of the cover glass CG1 are plane surfaces.

In order to maintain excellent optical performance of the wide-angle lens in accordance with the first embodiment of the invention, the wide-angle lens 1 must satisfies the following eight conditions:

$$-26 < f1_1/f1 < f1_2/f1 < f1_3/f1 < -3 \tag{1}$$

$$-1.64 < f1_{123}/f1 < -1.6 \tag{2}$$

$$30 < D1/D1_{89} < 271 \tag{3}$$

$$-226 < R1_{41}/f1 < 19 \tag{4}$$

$$-63 < R1_{61}/f1 < 7 \tag{5}$$

$$4.2 < f1_9/f1 < 5.6 \tag{6}$$

$$-16 < f1_{78}/f1_{56} < 254 \tag{7}$$

$$-0.7 < f1_{6789}/f1_{12345} < 0.8 \tag{8}$$

wherein $f1_1$ is an effective focal length of the first lens L11, $f1_2$ is an effective focal length of the second lens L12, $f1_3$ is an effective focal length of the third lens L13, $f1$ is an effective focal length of the wide-angle lens 1, $f1_{123}$ is an effective focal length of the combination of the first lens L11, the second lens L12 and the third lens L13, $D1$ is an interval between the object side surface S11 of the first lens L11 and the image plane IMA1 along the optical axis OA1, $D1_{89}$ is an interval between the image side surface S115 of the eighth lens L18 and the object side surface S116 of the ninth lens L19 along the optical axis OA1, $R1_{41}$ is a radius of curvature of the object side surface S17 of the fourth lens L14, $R1_{61}$ is a radius of curvature of the object side surface S111 of the sixth lens L16, $f1_9$ is an effective focal length of the ninth lens L19, $f1_{78}$ is an effective focal length of the combination of the seventh lens L17 and the eighth lens L18, $f1_{56}$ is an effective focal length of the combination of the fifth lens L15 and the sixth lens L16, $f1_{12345}$ is an effective focal length of the combination of the first lens L11, the second lens L12, the third lens L13, the fourth lens L14 and the fifth lens L15, and $f1_{6789}$ is an effective focal length of the combination of the sixth lens L16, the seventh lens L17, the eighth lens L18 and the ninth lens L19.

By the above design of the lenses and the aperture ST1, the wide-angle lens 1 is provided with a shortened total lens length, an increased field of view and an effective corrected aberration.

In order to achieve the above purposes and effectively enhance the optical performance, the wide-angle lens 1 in accordance with the first embodiment of the invention is provided with the optical specifications shown in Table 1, which include the effective focal length, field of view, radius of curvature of each lens surface, thickness between adjacent surface, refractive index of each lens and Abbe number of each lens. Table 1 shows that the effective focal length is equal to 0.8054 mm and F-number is equal to 2.8 for the wide-angle lens 1 of the first embodiment of the invention.

TABLE 1

Effective Focal Length = 0.8054 mm F-number = 2.8

| Surface Number | Radius of Curvature (mm) | Thickness (mm) | Nd | Vd | Remark |
|---|---|---|---|---|---|
| S11 | 19.3 | 3.32 | 1.788001 | 47.368522 | The First Lens L11 |
| S12 | 8.2 | 3.01 | | | |
| S13 | 14.26 | 1.05 | 1.788001 | 47.368522 | The Second Lens L12 |
| S14 | 4.65 | 2.3 | | | |
| S15 | 10.616 | 1 | 1.75046 | 45.428159 | The Third Lens L13 |
| S16 | 1.603 | 1.68 | | | |
| S17 | 8.2 | 0.8 | 1.740999 | 52.636502 | The Fourth Lens L14 |
| S18 | 2.38 | 4.87 | 1.84666 | 23.77794 | The Fifth Lens L15 |
| S19 | −19.3 | 0.35 | | | |
| S110 | ∞ | 0.16 | | | Aperture ST1 |
| S111 | 5.1 | 1.28 | 1.696797 | 55.532241 | The Sixth Lens L16 |
| S112 | −2.38 | 0.52 | 1.84666 | 23.77794 | The Seventh Lens L17 |
| S113 | 8.2 | 0.2 | | | |
| S114 | 6.44 | 2 | 1.58913 | 61.135024 | The Eighth Lens L18 |
| S115 | −6.44 | 0.1 | | | Interval $D1_{89}$ |
| S116 | 3.778 | 2.28 | 1.56073 | 57.101819 | The Ninth Lens L19 |
| S117 | −4.823 | 0.2 | | | |
| S118 | ∞ | 0.3 | 1.5168 | 64.167336 | Optical Filter OF1 |
| S119 | ∞ | 0.948 | | | |
| S120 | ∞ | 0.5 | 1.5168 | 64.167336 | Cover Glass CG1 |
| S121 | ∞ | 0.175 | | | |

The aspheric surface sag z of each lens in table 1 can be calculated by the following formula:

$$z = ch^2/\{1+[1-(k+1)c2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the first embodiment, the conic constant k and the aspheric coefficients A, B, C, D, E, F of each surface are shown in Table 2.

TABLE 2

| Surface Number | k | A | B | c | D | E | F |
|---|---|---|---|---|---|---|---|
| S15 | 2.065979 | −2.44E−04 | −1.20E−04 | 3.55E−06 | 1.28E−07 | −7.25604E−09 | 0 |
| S16 | −0.9641265 | 0.001570318 | −0.000233663 | −3.21E−05 | 6.09E−06 | −3.78E−07 | 0 |
| S116 | −1.212168 | −8.22E−04 | −7.44E−06 | 6.09E−08 | 1.47E−06 | −3.40716E−07 | −1.51881E−07 |
| S117 | −9.345112 | 4.34E−03 | 7.88E−05 | −2.17E−05 | −3.14625E−06 | −5.59517E−07 | −3.2104E−08 |

For the wide-angle lens 1 of the first embodiment, the effective focal length $f1_1$ of the first lens L11 is equal to −20.8395 mm, the effective focal length $f1_2$ of the second lens L12 is equal to 9.1988 mm, the effective focal length $f1_3$ of the third lens L13 is equal to −2.6414 mm, the effective focal length f1 of the wide-angle lens 1 is equal to 0.8054 mm, the effective focal length $f1_{123}$ of the combination of the first lens L11, the second lens L12 and the third lens L13 is equal to −1.3101 mm, the interval D1 between the object side surface S11 of the first lens L11 and the image plane IMA1 along the optical axis OA1 is equal to 27.043 mm, the interval $D1_{89}$ between the image side surface S115 of the eighth lens L18 and the object side surface S116 of the ninth lens L19 along the optical axis OA1 is equal to 0.1 mm, the radius of curvature $R1_{41}$ of the object side surface S17 of the fourth lens L14 is equal to 8.2 mm, the radius of curvature $R1_{61}$ of the object side surface S111 of the sixth lens L16 is equal to 5.1 mm, the effective focal length $f1_9$ of the ninth lens L19 is equal to 4.1756 mm, the effective focal length $f1_{78}$ of the combination of the seventh lens L17 and the eighth lens L18 is equal to 98.4482 mm, the effective focal length $f1_{56}$ of the combination of the fifth lens L15 and the sixth lens L16 is equal to 6.2650 mm, the effective focal length $f1_{12345}$ of the combination of the first lens L11, the second lens L12, the third lens L13, the fourth lens L14 and the fifth lens L15 is equal to 4.9129 mm, and the effective focal length $f1_{6789}$ of the combination of the sixth lens L16, the seventh lens L17, the eighth lens L18 and the ninth lens L19 is equal to 3.2963 mm. According to the above data, the following values can be obtained:

$f1_1/f1 = -25.8749$, $f1_2/f1 = -11.4215$, $f1_3/f1 = -3.2797$, $D1/D1_{89} = 270.43$, $R1_{41}/f1 = 10.1814$, $R1_{61}/f1 = 6.3323$, $f1_9/f1 = 5.1846$, $f1_{78}/f1_{56} = -15.7140$, $f1_{6789}/f1_{12345} = -0.6710$, which respectively satisfy the above conditions (1)–(8).

Figure 2A:
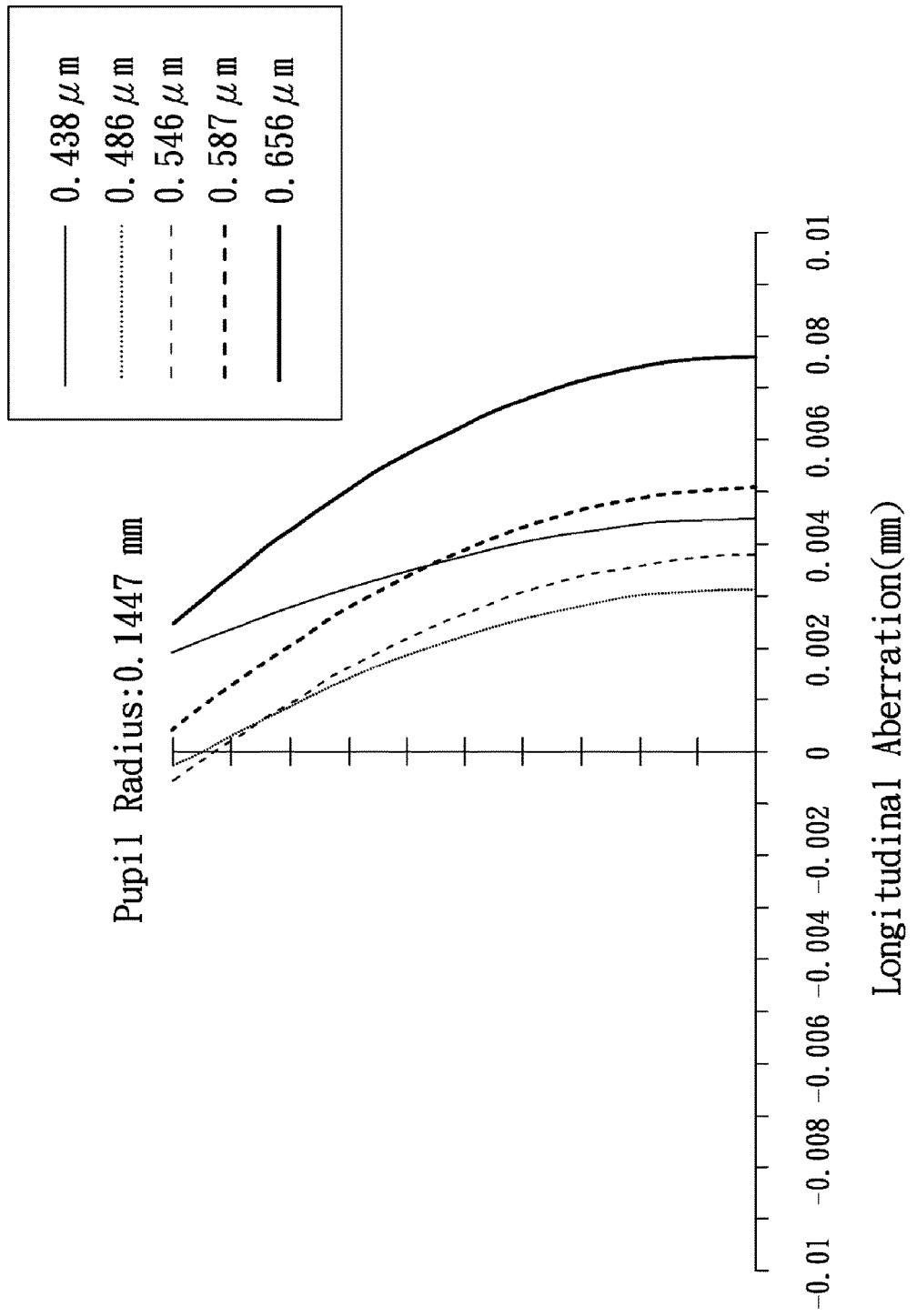
FIG. 2A depicts a longitudinal aberration diagram of the wide-angle lens assembly in accordance with the first embodiment of the invention.
Figure 2B:
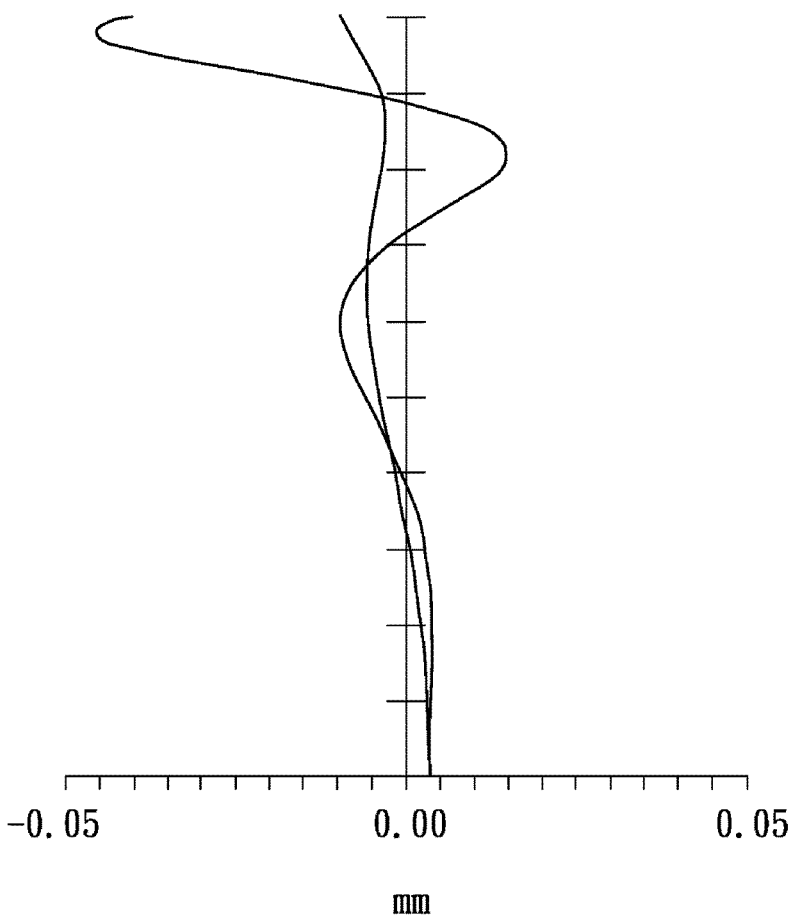
FIG. 2B is a field curvature diagram of the wide-angle lens in accordance with the first embodiment of the invention.
Figure 2C:
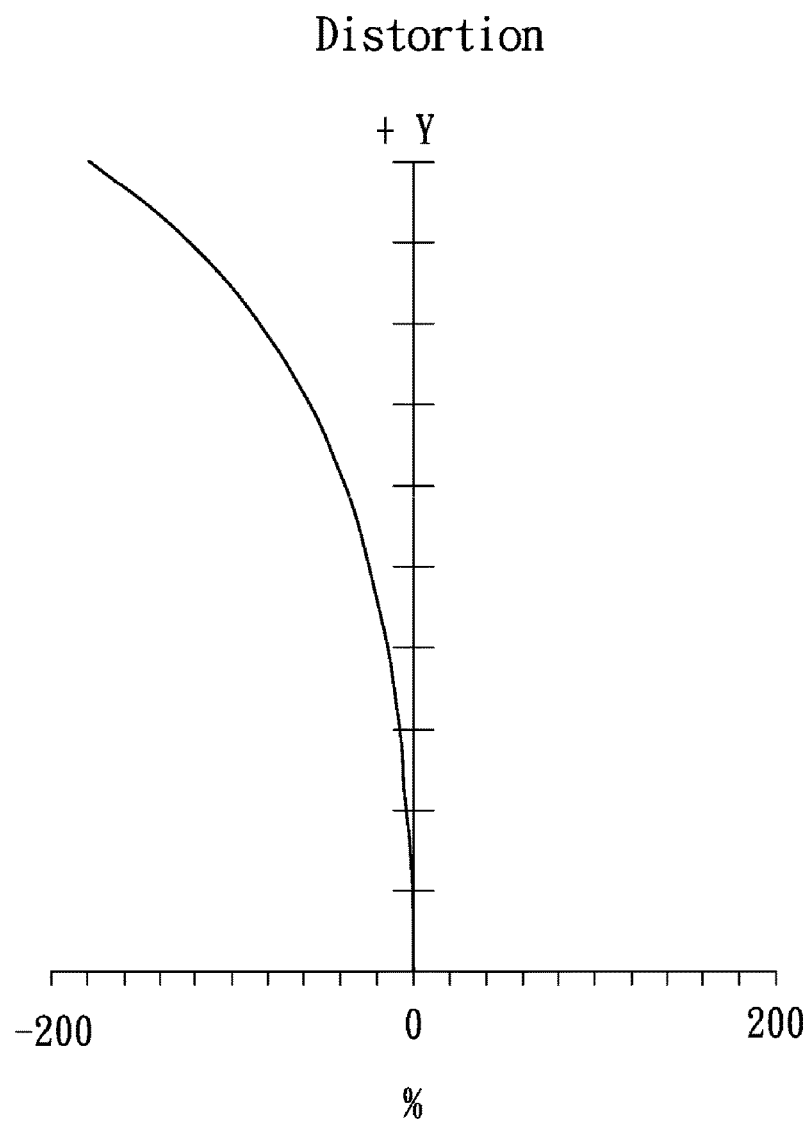
FIG. 2C is a distortion diagram of the wide-angle lens in accordance with the first embodiment of the invention.
Figure 2D:
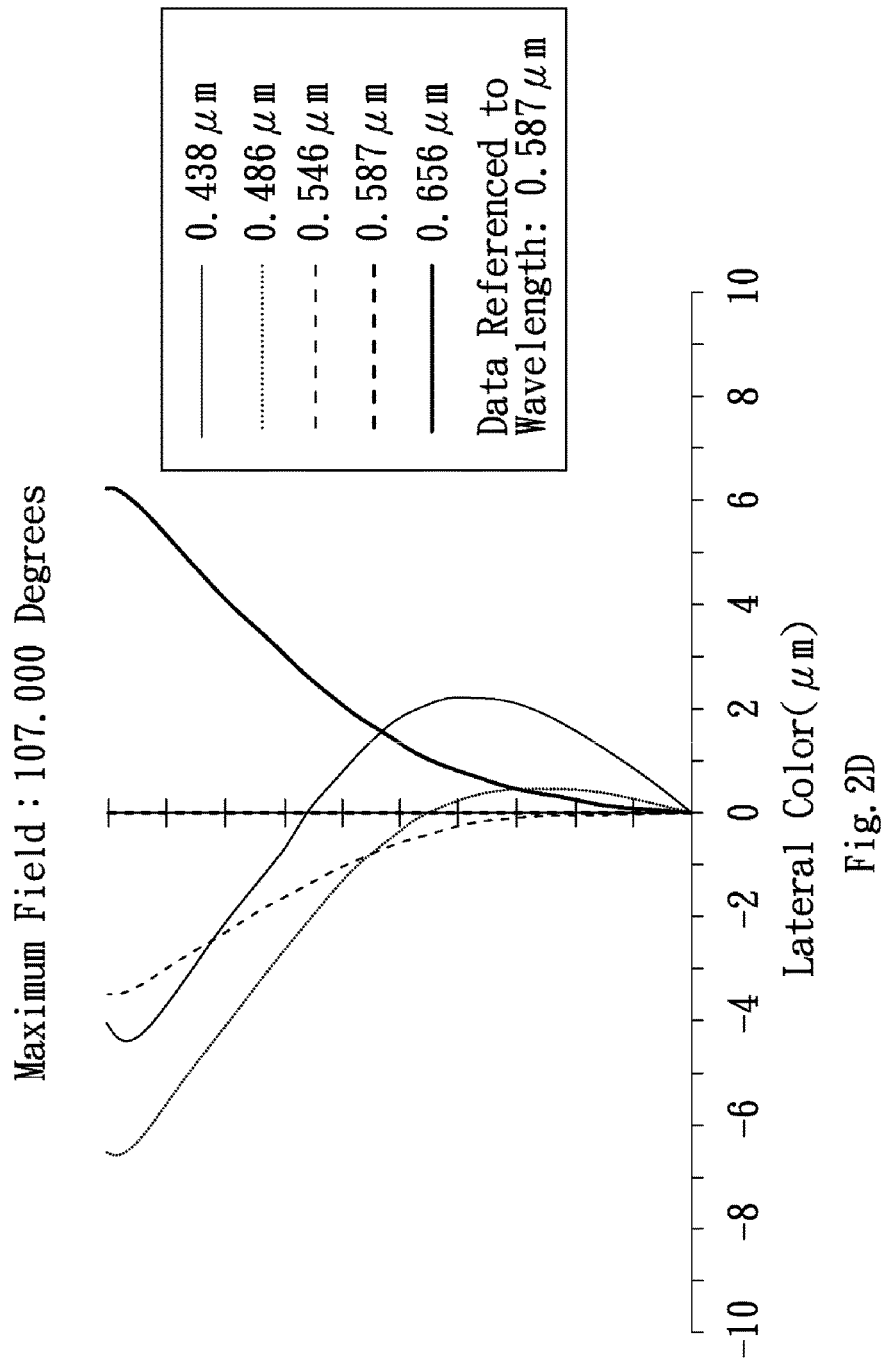
FIG. 2D is a lateral color diagram of the wide-angle lens in accordance with the first embodiment of the invention.
Figure 2E:
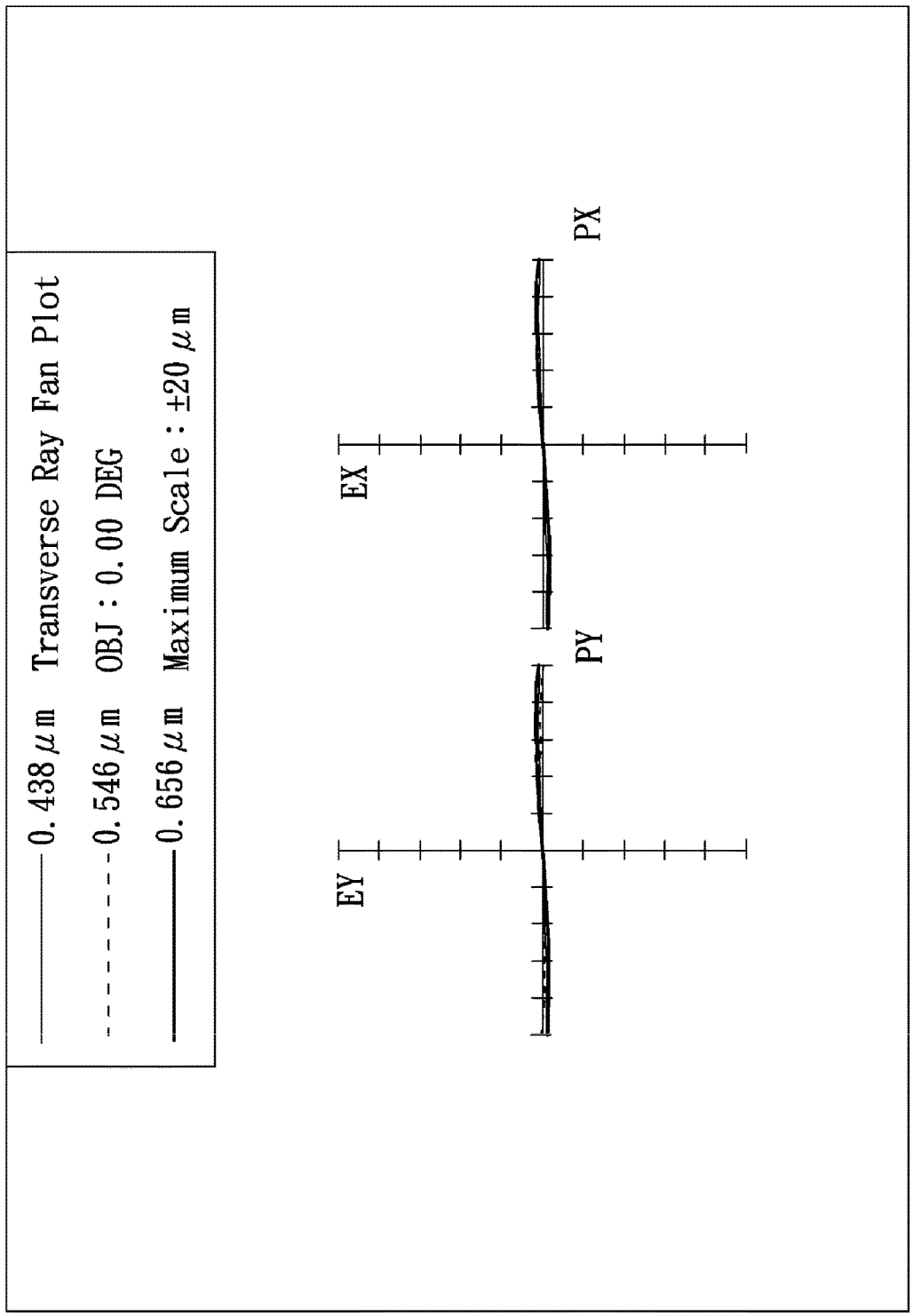
FIGS. 2E-2G are transverse ray fan diagrams of the wide-angle lens in accordance with the first embodiment of the invention.
Figure 2F:
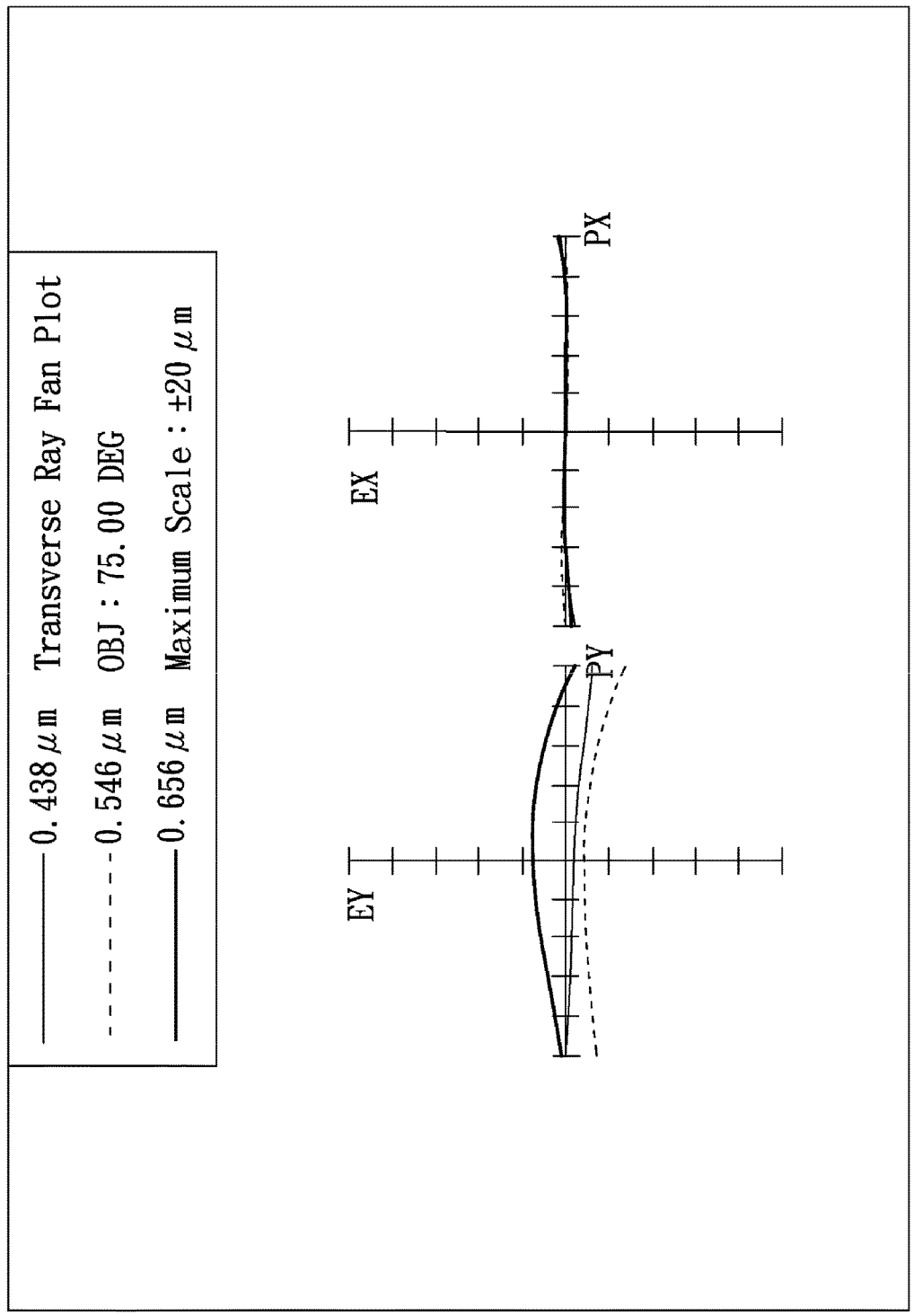
Figure 2G:
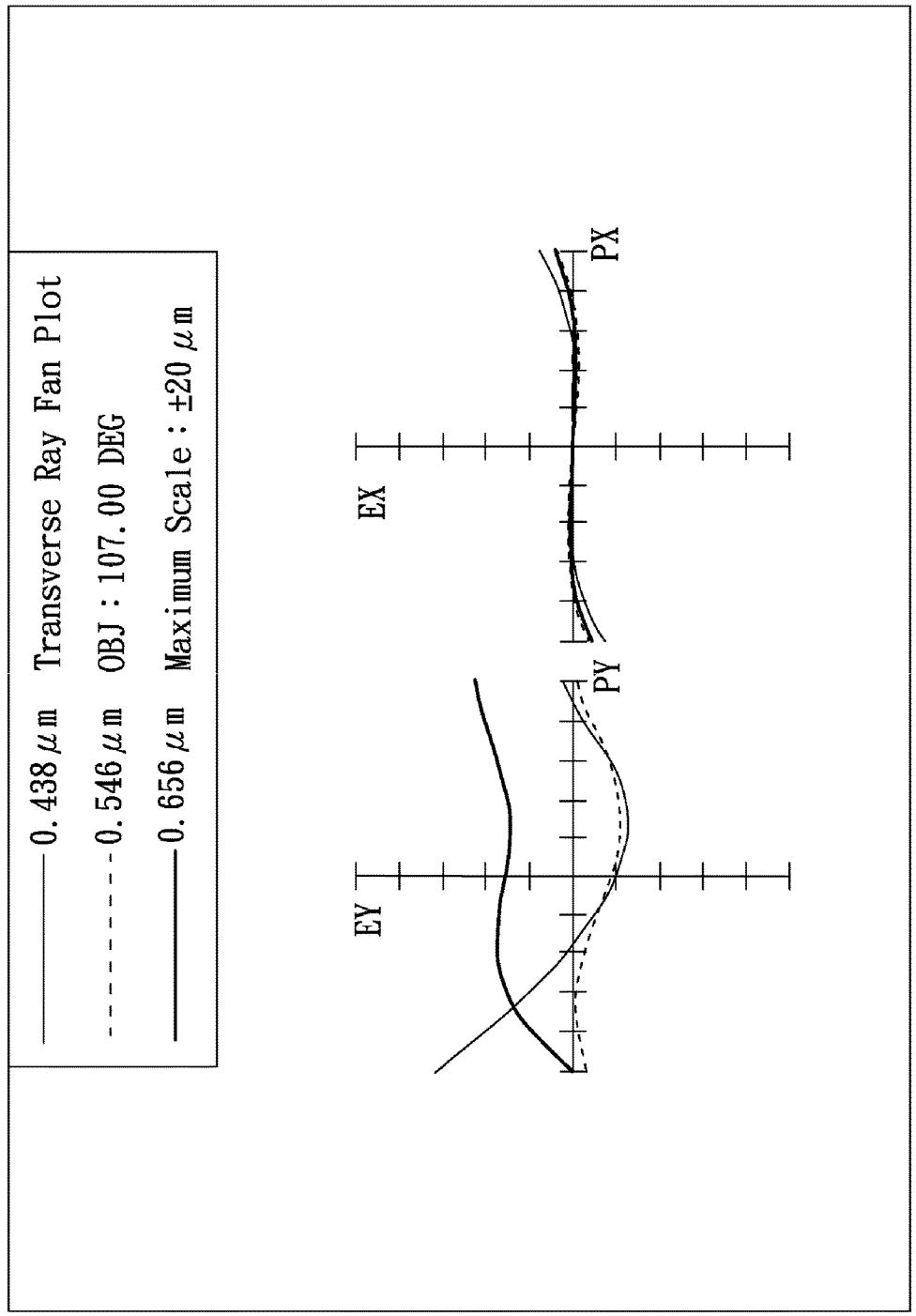

By the above arrangements of the lenses and the aperture ST1, the wide-angle lens 1 of the first embodiment can meet the requirements of optical performance as seen in FIGS. 2A-2G, wherein FIG. 2A shows the longitudinal aberration diagram of the wide-angle lens 1 in accordance with the first embodiment of the invention, FIG. 2B shows the field curvature diagram of the wide-angle lens 1 in accordance with the first embodiment of the invention, FIG. 2C shows the distortion diagram of the wide-angle lens 1 in accordance with the first embodiment of the invention, FIG. 2D shows the lateral color diagram of the wide-angle lens 1 in accordance with the first embodiment of the invention and FIGS. 2E-2G show the transverse ray fan diagrams of the wide-angle lens 1 in accordance with the first embodiment of the invention.

It can be seen from FIG. 2A that the longitudinal aberration in the wide-angle lens 1 of the first embodiment ranges from 0.001 mm to 0.008 mm for the wavelength of 0.438 μm, 0.486 μm, 0.546 μm, 0.587 μm and 0.656 μm. It can be seen from FIG. 2B that the field curvature of tangential direction and sagittal direction in the wide-angle lens 1 of the first embodiment ranges from 0.05 mm to 0.02 mm for the wavelength of 0.546 μm. It can be seen from FIG. 2C that the distortion in the wide-angle lens 1 of the first embodiment ranges from 200% to 0% for the wavelength of 0.546 μm. It can be seen from FIG. 2D that the lateral color with reference wavelength of 0.587 μm in the wide-angle lens 1 of the first embodiment ranges from 7 μm to 7 μm for the wavelength of 0.438 μm, 0.486 μm, 0.546 μm, 0.587 μm and 0.656 μm, with field ranged from 0 degrees to 107 degrees. It can be seen from FIGS. 2E-2G that the transverse ray aberration in the wide-angle lens 1 of the first embodiment ranges from 5.0 μm to 13.0 μm wherein the wavelength is 0.438 μm, 0.546 μm and 0.656 μm for field of 0.00 degrees, 75.00 degrees and 107.00 degrees, respectively. It is obvious that the longitudinal aberration, the field curvature, the distortion, the lateral color and the transverse ray aberration of the wide-angle lens 1 of the first embodiment can be corrected effectively. Therefore, the wide-angle lens 1 of the first embodiment is capable of good optical performance.

Figure 3:
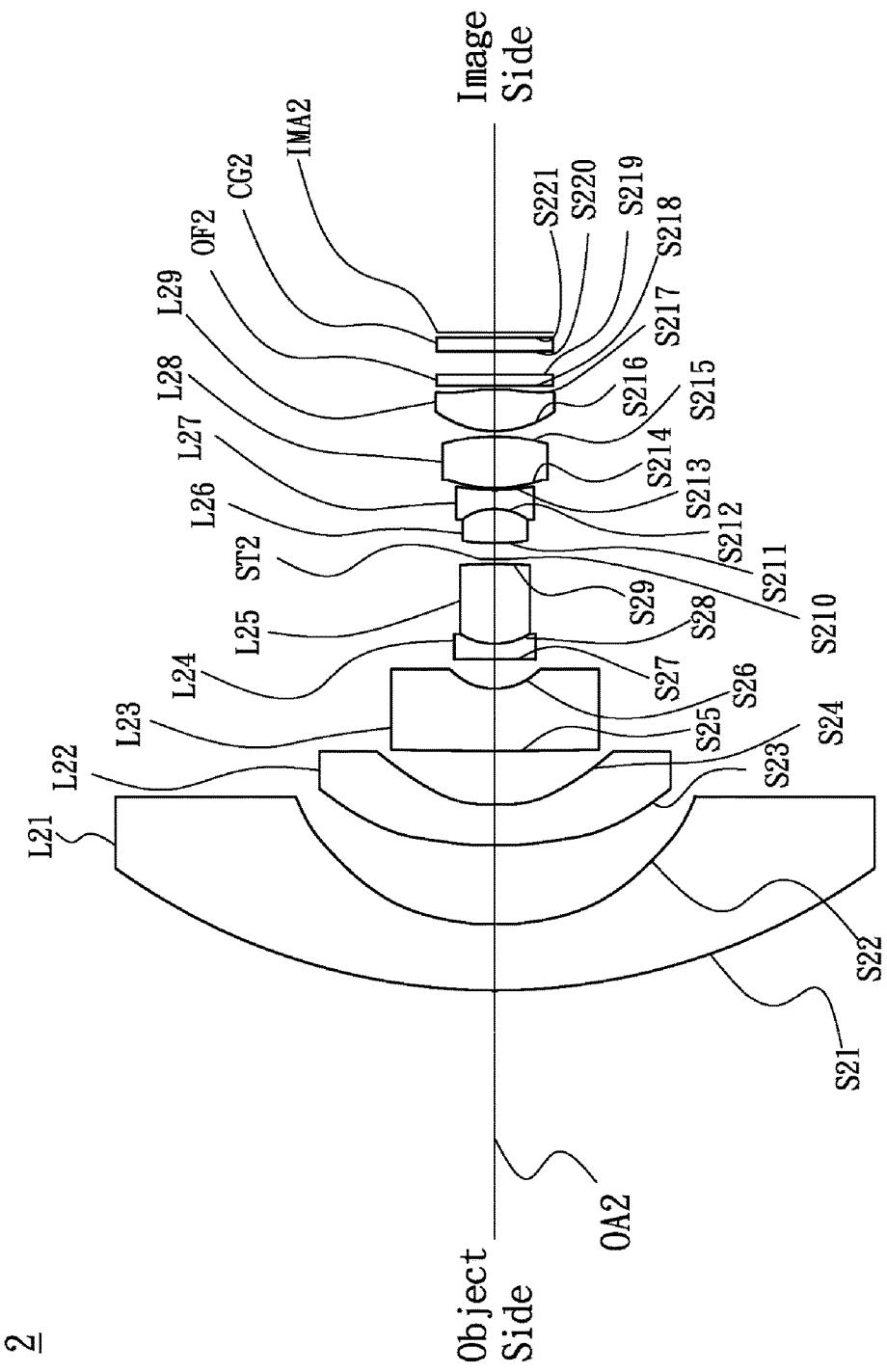
FIG. 3 is a lens layout diagram of a wide-angle lens in accordance with a second embodiment of the invention.

Referring to FIG. 3, FIG. 3 is a lens layout diagram of a wide-angle lens in accordance with a second embodiment of the invention. The wide-angle lens 2, from an object side to an image side along an optical axis OA2, includes a first lens L21, a second lens L22, a third lens L23, a fourth lens L24, a fifth lens L25, an aperture ST2, a sixth lens L26, a seventh lens L27, an eighth lens L28, a ninth lens L29, an optical filter OF2 and a cover glass CG2. In operation, an image of light rays from the object side is formed at an image plane IMA2. The first lens L21 is a meniscus lens, made of glass material and with negative refractive power, wherein the object side surface S21 is a convex surface, the image side surface S22 is a concave surface and both of the object side surface S21 and image side surface S22 are spherical surfaces. The second lens L22 is a meniscus lens, made of glass material and with negative refractive power, wherein the object side surface S23 is a convex surface, the image side surface S24 is a concave surface and both of the object side surface S23 and image side surface S24 are aspheric surfaces. The third lens L23 is a meniscus lens, made of glass material and with negative refractive power, wherein the object side surface S25 is a convex surface, the image side surface S26 is a concave surface and both of the object side surface S25 and image side surface S26 are spherical surfaces. The fourth lens L24 is a biconcave lens and made of glass material, wherein both of the object side surface S27 and image side surface S28 are spherical surfaces. The fifth lens L25 is a biconvex lens and made of glass material, wherein both of the object side surface S28 and image side surface S29 are spherical surfaces. The sixth lens L26 is a biconvex lens and made of glass material, wherein both of the object side surface S211 and image side surface S212 are spherical surfaces. The seventh lens L27 is a biconcave lens and made of glass material, wherein both of the object side surface S212 and image side surface S213 are spherical surfaces. The eighth lens L28 is a biconvex lens and made of glass material, wherein both of the object side surface S214 and image side surface S215 are spherical surfaces. The ninth lens L29 is a biconvex lens and made of glass material, wherein both of the object side surface S216 and image side surface S217 are aspheric surfaces. The fourth lens L24 and the fifth lens L25 are cemented together to form a cemented lens. The sixth lens L26 and the seventh lens L27 are cemented together to form a cemented lens. Both of the object side surface S218 and image side surface S219 of the optical filter OF2 are plane surfaces. Both of the object side surface S220 and image side surface S221 of the cover glass CG2 are plane surfaces.

In order to maintain excellent optical performance of the wide-angle lens in accordance with the second embodiment of the invention, the wide-angle lens 2 must satisfies the following eight conditions:

$$-26 < f2_1/f2 < f2_2/f2 < f2_3/f2 < -3 \quad (9)$$

$$-1.64 < f2_{123}/f2 < -1.6 \quad (10)$$

$$30 < D2/D2_{89} < 271 \quad (11)$$

$$-226 < R2_{41}/f2 < 19 \quad (12)$$

$$-63 < R2_{61}/f2 < 7 \quad (13)$$

$$4.2 < f2_9/f2 < 5.6 \quad (14)$$

$$-16 < f2_{28}/f2_{56} < 254 \quad (15)$$

$$-0.7 < f2_{6789}/f2_{12345} < 0.8 \quad (16)$$

wherein $f2_1$ is an effective focal length of the first lens L21, $f2_2$ is an effective focal length of the second lens L22, $f2_3$ is an effective focal length of the third lens L23, f2 is an effective focal length of the wide-angle lens 2, $f2_{123}$ is an effective focal length of the combination of the first lens L21, the second lens L22 and the third lens L23, D2 is an interval between the object side surface S21 of the first lens L21 and the image plane IMA2 along the optical axis OA2, $D2_{89}$ is an interval between the image side surface S215 of the eighth lens L28 and the object side surface S216 of the ninth lens L29 along the optical axis OA2, $R2_{41}$ is a radius of curvature of the object side surface S27 of the fourth lens L24, $R2_{61}$ is a radius of curvature of the object side surface S211 of the sixth lens L26, $f2_9$ is an effective focal length of the ninth lens L29, $f2_{78}$ is an effective focal length of the combination of the seventh lens L27 and the eighth lens L28, $f2_{56}$ is an effective focal length of the combination of the fifth lens L25 and the sixth lens L26, $f2_{12345}$ is an effective focal length of the combination of the first lens L21, the second lens L22, the third lens L23, the fourth lens L24 and the fifth lens L25, and $f2_{6789}$ is an effective focal length of the combination of the sixth lens L26, the seventh lens L27, the eighth lens L28 and the ninth lens L29.

By the above design of the lenses and the aperture ST2, the wide-angle lens 2 is provided with a shortened total lens length, an increased field of view and an effective corrected aberration.

In order to achieve the above purposes and effectively enhance the optical performance, the wide-angle lens 2 in accordance with the second embodiment of the invention is provided with the optical specifications shown in Table 3, which include the effective focal length, field of view, radius of curvature of each lens surface, thickness between adjacent surface, refractive index of each lens and Abbe number of each lens. Table 3 shows that the effective focal length is equal to 0.8059 mm and F-number is equal to 2.8 for the wide-angle lens 2 of the second embodiment of the invention.

TABLE 3

Effective Focal Length = 0.8059 mm F-number = 2.8

| Surface Number | Radius of Curvature (mm) | Thickness (mm) | Nd | Vd | Remark |
|---|---|---|---|---|---|
| S21 | 24.28688 | 2.481849 | 1.788001 | 47.368522 | The First Lens L21 |
| S22 | 8.286387 | 3.059764 | | | |
| S23 | 15.64951 | 1.543395 | 1.69003 | 52.755504 | The Second Lens L22 |
| S24 | 4.705134 | 2.022385 | | | |
| S25 | 105.7127 | 2.283504 | 1.743299 | 49.221606 | The Third Lens L23 |
| S26 | 2.152162 | 1.19825 | | | |
| S27 | −181.5149 | 0.5296468 | 1.740999 | 52.636502 | The Fourth Lens L24 |
| S28 | 2.279892 | 3.080823 | 1.84666 | 23.77794 | The Fifth Lens L25 |
| S29 | −7.17175 | 0.1000026 | | | |
| S210 | ∞ | 0.6626973 | | | Aperture ST2 |
| S211 | 4.395139 | 1.306946 | 1.696797 | 55.532241 | The Sixth Lens L26 |
| S212 | −2.108207 | 0.7123469 | 1.84666 | 23.77794 | The Seventh Lens L27 |
| S213 | 7.453903 | 0.09926276 | | | |
| S214 | 5.9582 | 1.928571 | 1.58913 | 61.135024 | The Eighth Lens L28 |
| S215 | −6.794451 | 0.191463 | | | Interval $D2_{89}$ |
| S216 | 3.605159 | 1.593348 | 1.56073 | 57.101819 | The Ninth Lens L29 |
| S217 | −4.956414 | 0.2 | | | |
| S218 | ∞ | 0.3 | 1.5168 | 64.167336 | Optical Filter OF2 |
| S219 | ∞ | 0.948 | | | |
| S220 | ∞ | 0.5 | 1.5168 | 64.167336 | Cover Glass CG2 |
| S221 | ∞ | 0.2215161 | | | |

The aspheric surface sag z of each lens in table 3 can be calculated by the following formula:

$$z=ch^2/\{1+[1-(k+1)c^2h^2]^{1/2}\}Ah^4+Bh^6+Ch^8+Dh^{10}+Eh^{12}+Fh^{14}$$

where c is curvature, h is the vertical distance from the lens surface to the optical axis, k is conic constant and A, B, C, D, E and F are aspheric coefficients.

In the second embodiment, the conic constant k and the aspheric coefficients A, B, C, D, E, F of each surface are shown in Table 4.

TABLE 4

| Surface Number | k | A | B | c | D | E | F |
|---|---|---|---|---|---|---|---|
| S23 | 2.198471 | 0.000329868 | −5.51E−07 | −3.00E−08 | −5.52E−10 | 6.05E−12 | 0 |
| S24 | −0.1333299 | −0.000898423 | −2.68E−05 | −7.15E−07 | −3.27E−08 | −2.34E−09 | 0 |
| S216 | −0.9930042 | −0.000113482 | 1.04E−05 | 1.79E−06 | 3.41E−06 | −1.22E−07 | −2.34E−07 |
| S217 | −11.08184 | 0.00664027 | 0.000285495 | 6.60E−07 | −1.13E−06 | −4.55E−07 | −1.78E−09 |

For the wide-angle lens 2 of the second embodiment, the effective focal length $f2_1$ of the first lens L21 is equal to −17.1318 mm, the effective focal length $f2_2$ of the second lens L22 is equal to −10.3453 mm, the effective focal length $f2_3$ of the third lens L23 is equal to 2.9835 mm, the effective focal length f2 of the wide-angle lens 2 is equal to 0.8059 mm, the effective focal length $f2_{123}$ of the combination of the first lens L21, the second lens L22 and the third lens L23 is equal to 1.3211 mm, the interval D2 between the object side surface S21 of the first lens L21 and the image plane IMA2 along the optical axis OA2 is equal to 24.9638 mm, the interval $D2_{89}$ between the image side surface S215 of the eighth lens L28 and the object side surface S216 of the ninth lens L29 along the optical axis OA2 is equal to 0.1915 mm, the radius of curvature $R2_{41}$ of the object side surface S27 of the fourth lens L24 is equal to 181.5149 mm, the radius of curvature $R2_{61}$ of the object side surface S211 of the sixth lens L26 is equal to 4.3951 mm, the effective focal length $f2_9$ of the ninth lens L29 is equal to 3.9886 mm, the effective focal length $f2_{78}$ of the combination of the seventh lens L27 and the eighth lens L28 is equal to 1667.5455 mm, the effective focal length $f2_{56}$ of the combination of the fifth lens L25 and the sixth lens L26 is equal to 6.5694 mm, the effective focal length $f2_{12345}$ of the combination of the first lens L21, the second lens L22, the third lens L23, the fourth lens L24 and the fifth lens L25 is equal to 5.7721 mm, and the effective focal length $f2_{6789}$ of the combination of the sixth lens L26, the seventh lens L27, the eighth lens L28 and the ninth lens L29 is equal to 3.2366 mm. According to the above data, the following values can be obtained:

$f2_1/f2=-21.2586,$ $f2_2/f2=-12.8374$ $f2_3/f2=-3.7021$ $f2_{123}/f2=-1.6394,$ $D2/D2_{89}=130.3843,$ $R2_{41}/f2=-225.2387,$ $R2_{61}/f2=5.4539,$ $f2_9/f2=4.9493,$ $f2_{78}/f2_{56}=-253.8345,$ $f2_{6789}/f2_{12345}=-0.5607,$ which respectively satisfy the above conditions (9)-(16).

Figure 4B:
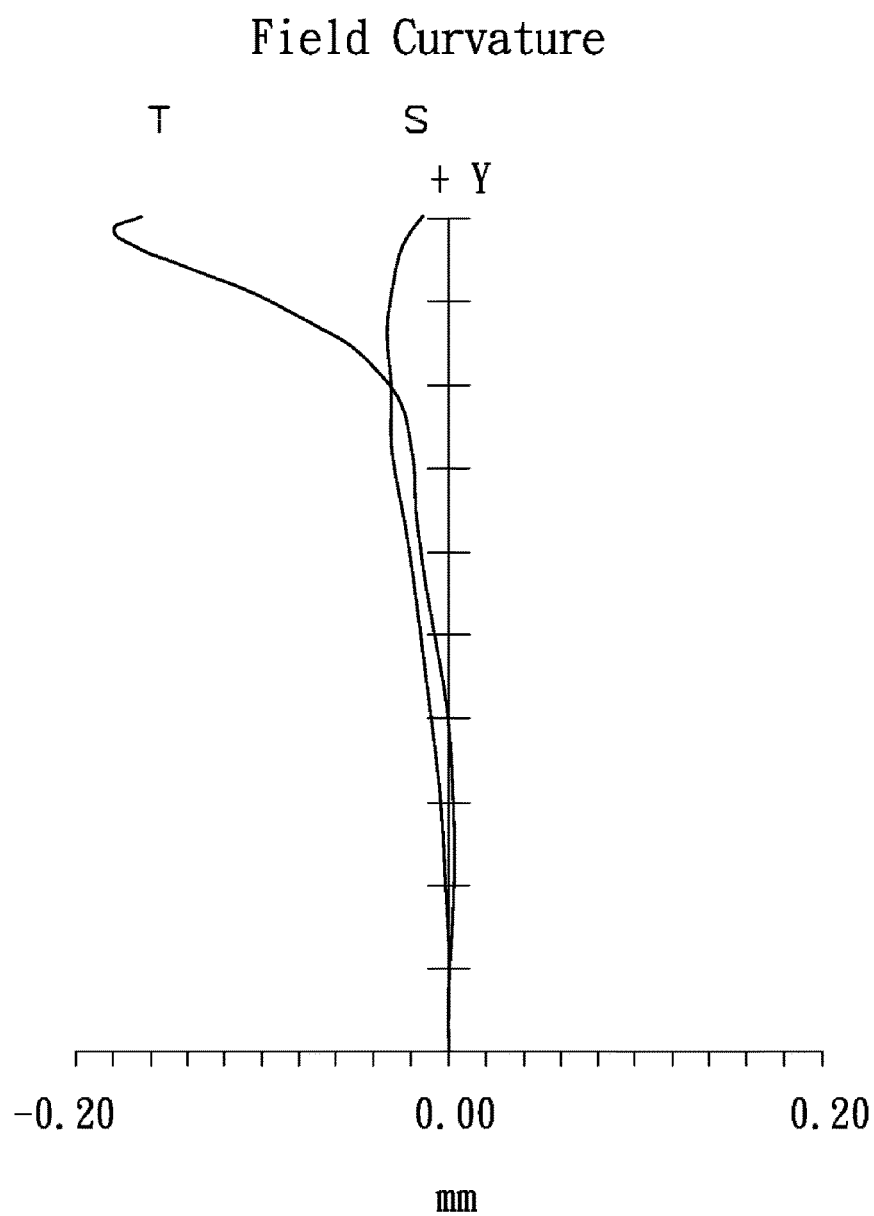
FIG. 4B is a field curvature diagram of the wide-angle lens in accordance with the second embodiment of the invention.
Figure 4C:
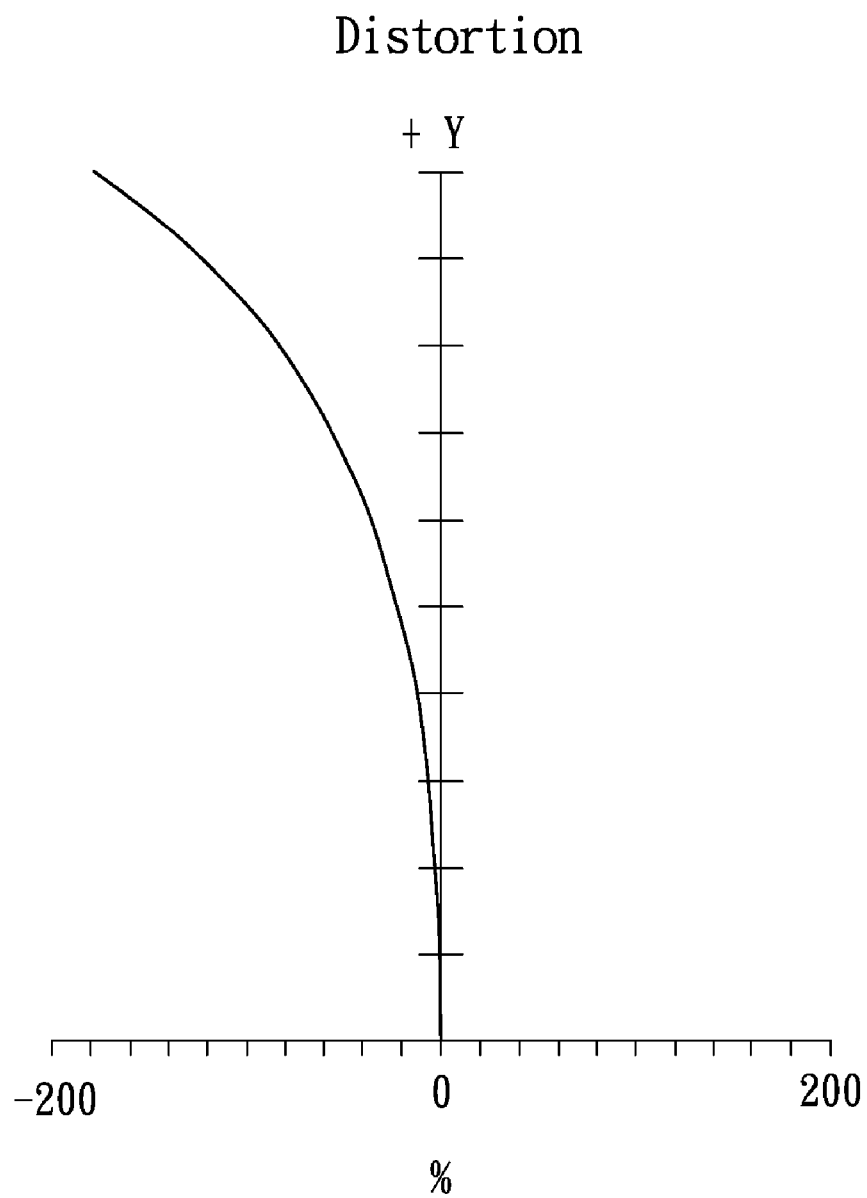
FIG. 4C is a distortion diagram of the wide-angle lens in accordance with the second embodiment of the invention.
Figure 4D:
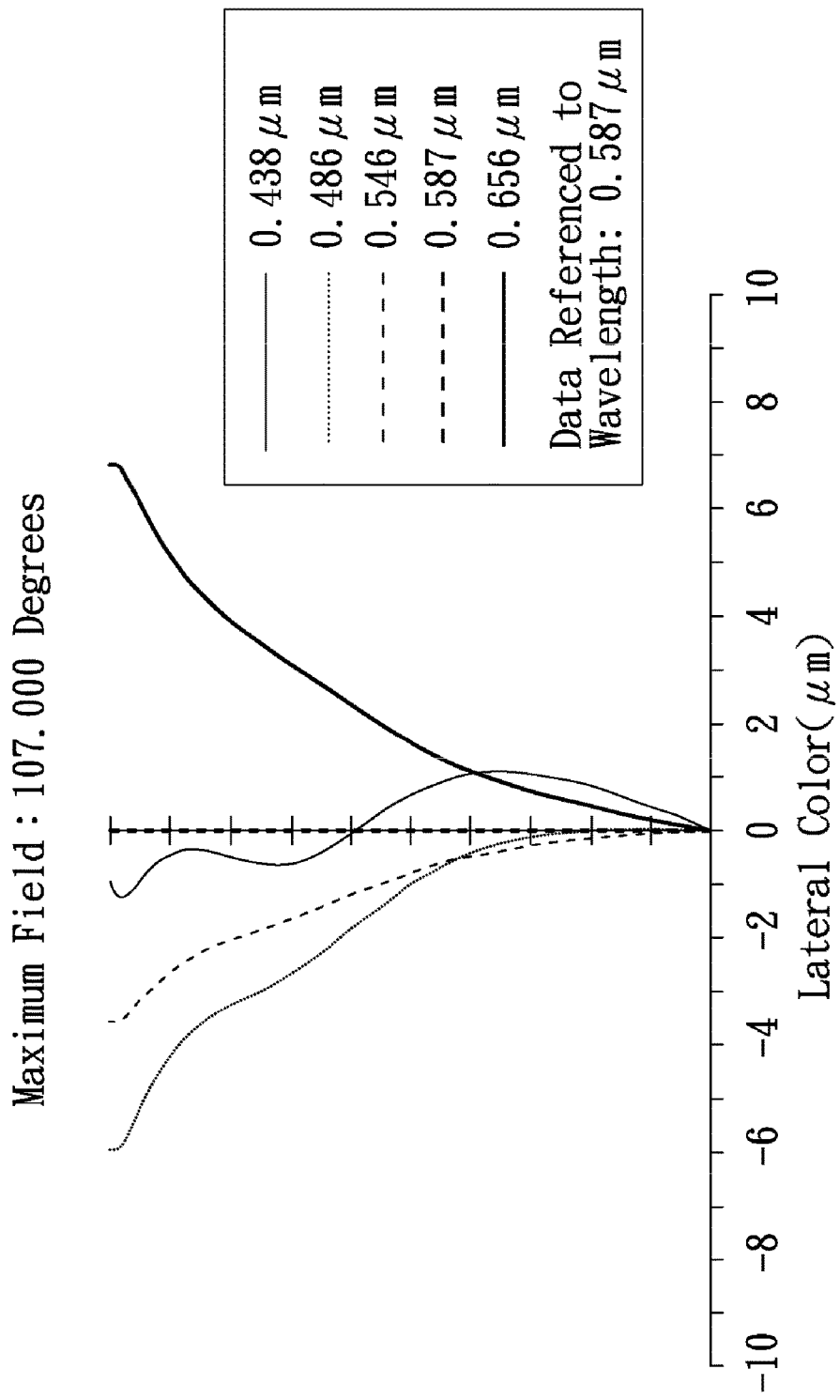
FIG. 4D is a lateral color diagram of the wide-angle lens in accordance with the second embodiment of the invention.
Figure 4E:
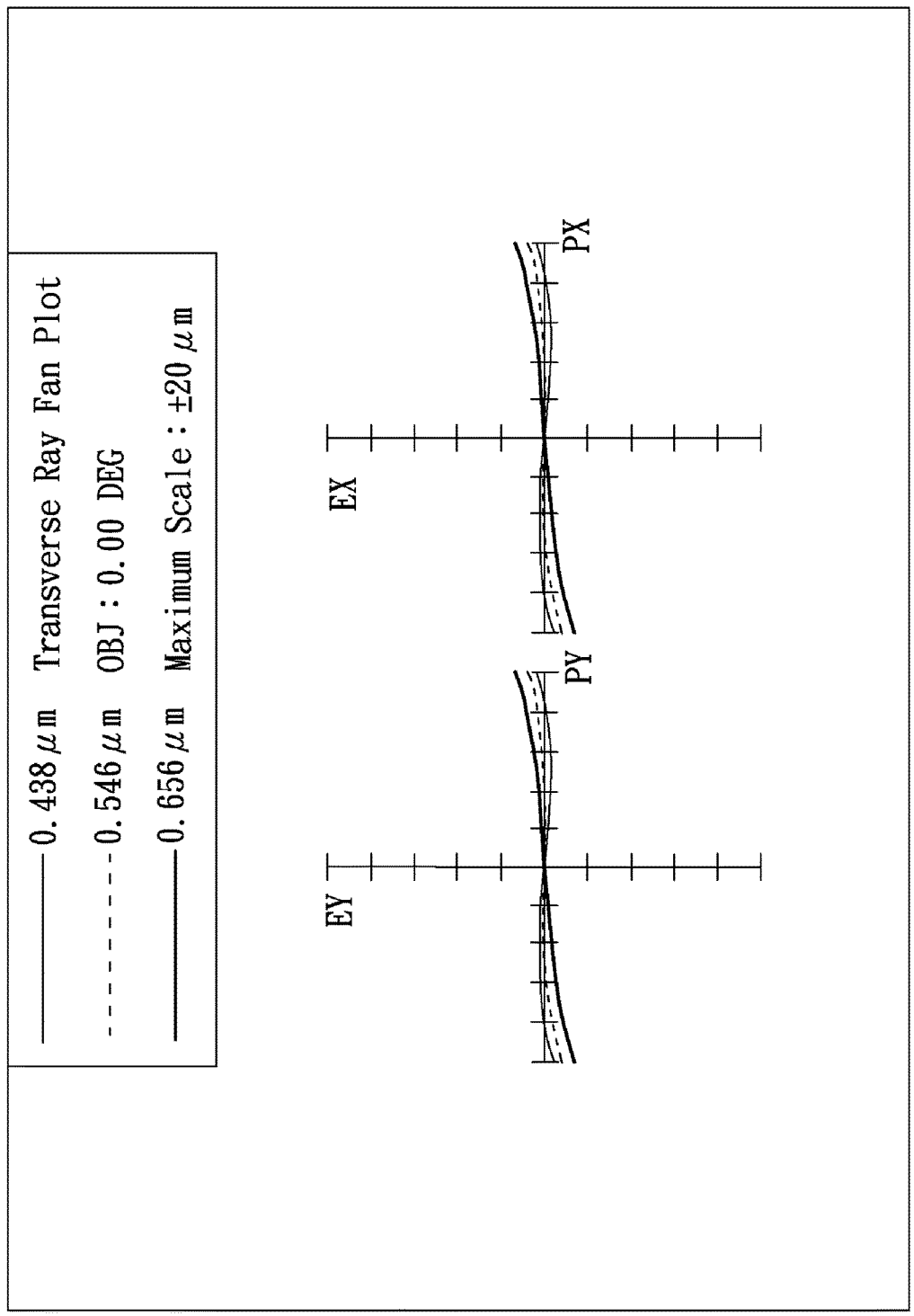
FIGS. 4E-4G are transverse ray fan diagrams of the wide-angle lens in accordance with the second embodiment of the invention.
Figure 4F:
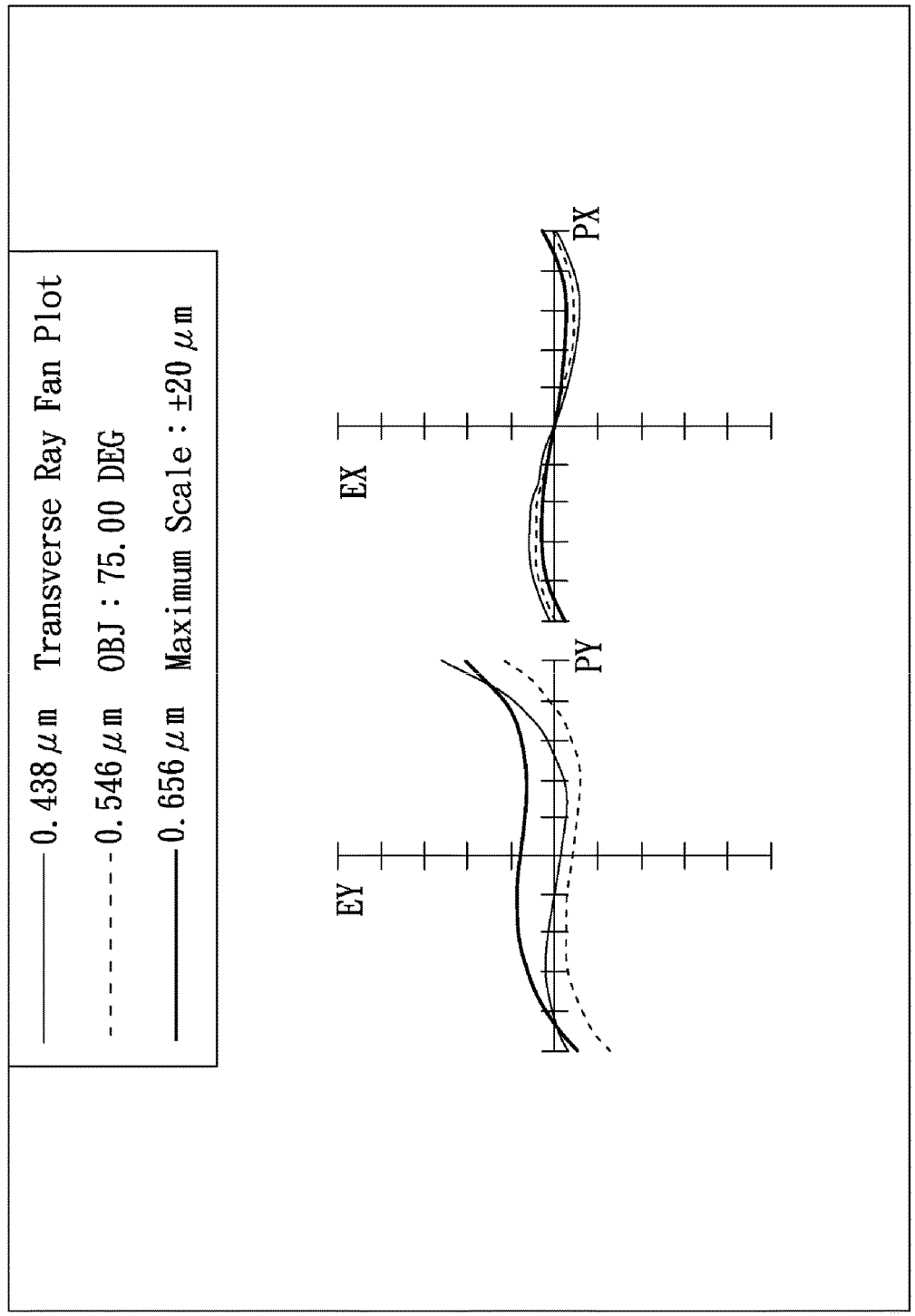
Figure 4G:
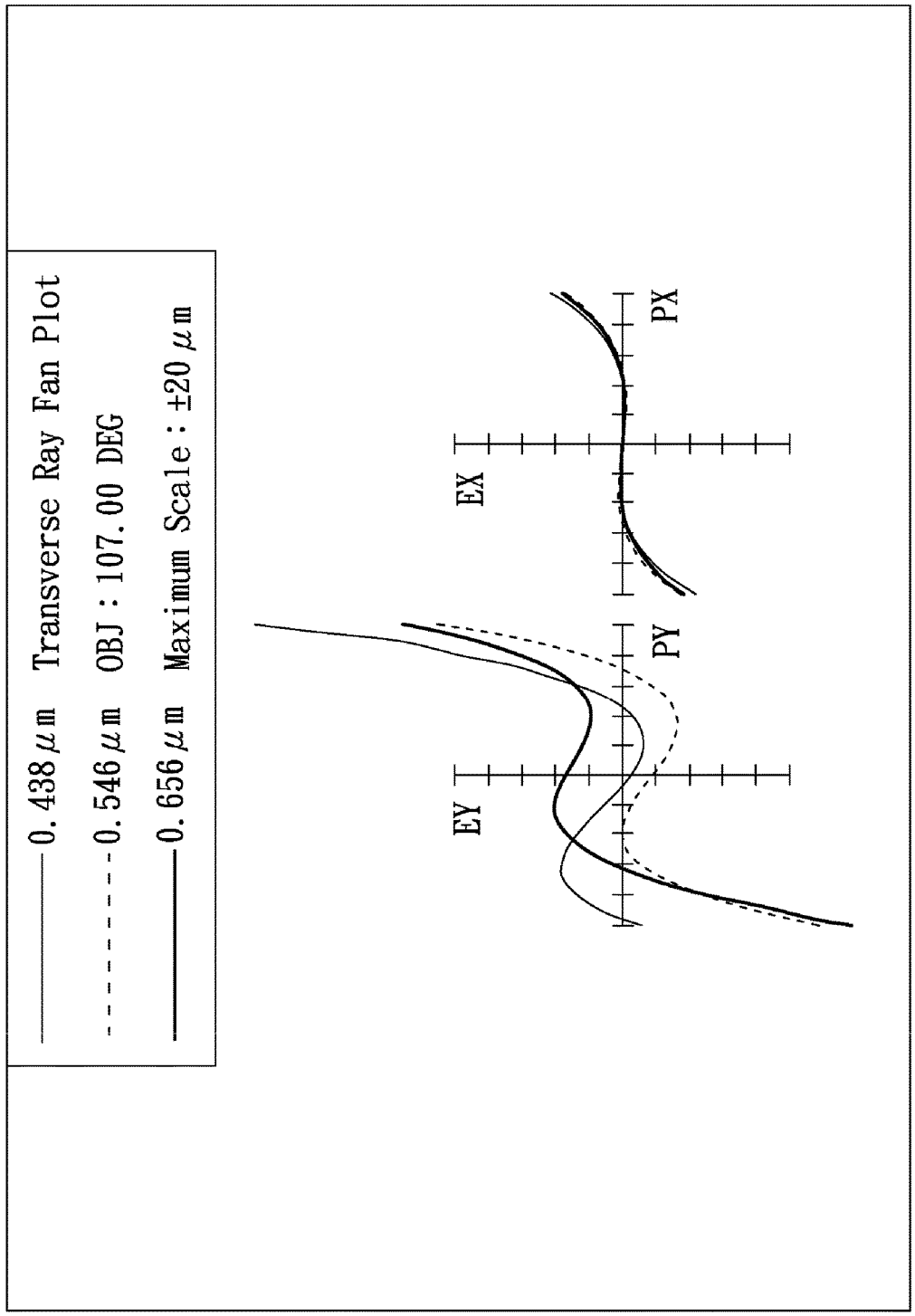

By the above arrangements of the lenses and the aperture ST2, the wide-angle lens 2 of the second embodiment can meet the requirements of optical performance as seen in FIGS. 4A-4G, wherein FIG. 4A shows the longitudinal aberration diagram of the wide-angle lens 2 in accordance with the second embodiment of the invention, FIG. 4B shows the field curvature diagram of the wide-angle lens 2 in accordance with the second embodiment of the invention, FIG. 4C shows the distortion diagram of the wide-angle lens 2 in accordance with the second embodiment of the invention, FIG. 4D shows the lateral color diagram of the wide-angle lens 2 in accordance with the second embodiment of the invention and FIGS. 4E-4G show the transverse ray fan diagrams of the wide-angle lens 2 in accordance with the second embodiment of the invention.

Figure 5:
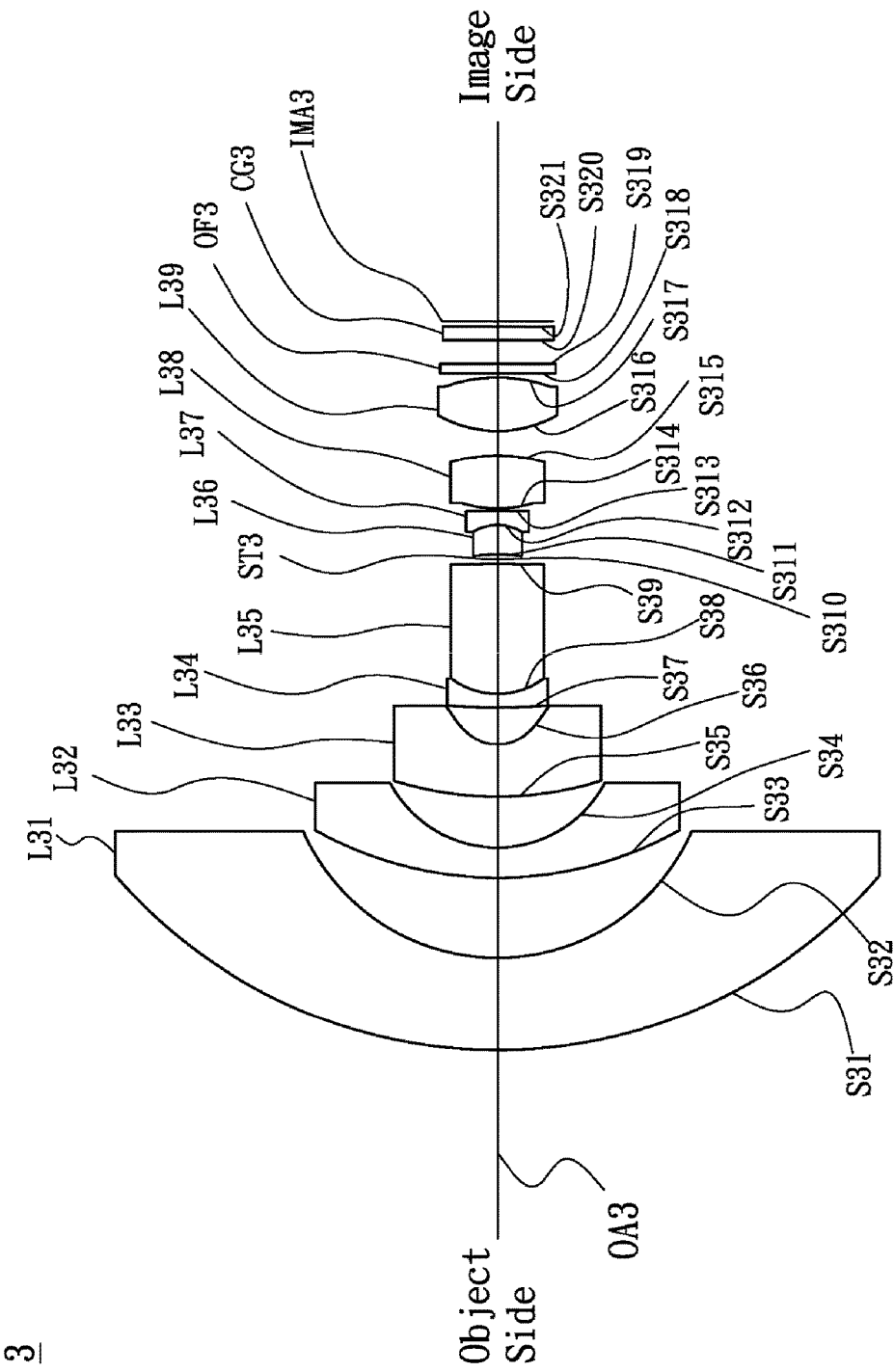
FIG. 5 is a lens layout diagram of a wide-angle lens in accordance with a third embodiment of the invention.

It can be seen from FIG. 4A that the longitudinal aberration in the wide-angle lens 2 of the second embodiment ranges from 0.008 mm to 0.015 mm for the wavelength of 0.438 µm, 0.486 µm, 0.546 µm, 0.587 µm and 0.656 µm. It can be seen from FIG. 4B that the field curvature of tangential direction and sagittal direction in the wide-angle lens 2 of the second embodiment ranges from 0.20 mm to 0.01 mm for the wavelength of 0.546 µm. It can be seen from FIG. 4C that the distortion in the wide-angle lens 2 of the second embodiment ranges from 200% to 0% for the wavelength of 0.546 µm. It can be seen from FIG. 4D that the lateral color with reference wavelength of 0.587 µm in the wide-angle lens 2 of the second embodiment ranges from 6 µm to 7 µm for the wavelength of 0.438 µm, 0.486 µm, 0.546 µm, 0.587 µm and 0.656 µm, with field ranged from 0 degrees to 107 degrees. It can be seen from FIGS. 4E-4G that the transverse ray aberration in the wide-angle lens 2 of the second embodiment ranges from 27.5 µm to 44.5 µm wherein the wavelength is 0.438 µm, 0.546 µm and 0.656 µm for field of 0.00 degrees, 75.00 degrees and 107.00 degrees, respectively. It is obvious that the longitudinal aberration, the field curvature, the distortion, the lateral color and the transverse ray aberration of the wide-angle lens 2 of the second embodiment can be corrected effectively. Therefore, the wide-angle lens 2 of the second embodiment is capable of good optical performance Referring to FIG. 5, FIG. 5 is a lens layout diagram of a wide-angle lens in accordance with a third embodiment of the invention. The wide-angle lens 3, from an object side to an image side along an optical axis OA3, includes a first lens L31, a second lens L32, a third lens L33, a fourth lens L34, a fifth lens L35, an aperture ST3, a sixth lens L36, a seventh lens L37, an eighth lens L38, a ninth lens L39, an optical filter OF3 and a cover glass CG3. In operation, an image of light rays from the object side is formed at an image plane IMA3. The first lens L31 is a meniscus lens, made of glass material and with negative refractive power, wherein the object side surface S31 is a convex surface, the image side surface S32 is a concave surface and both of the object side surface S31 and image side surface S32 are spherical surfaces. The second lens L32 is a meniscus lens, made of glass material and with negative refractive power, wherein the object side surface S33 is a convex surface, the image side surface S34 is a concave surface and both of the object side surface S33 and image side surface S34 are spherical surfaces. The third lens L33 is a meniscus lens, made of glass material and with negative refractive power, wherein the object side surface S35 is a convex surface, the image side surface S36 is a concave surface and both of the object side surface S35 and image side surface S36 are aspheric surfaces. The fourth lens L34 is a meniscus lens and made of glass material, wherein the object side surface S37 is a convex surface, the image side surface S38 is a concave surface and both of the object side surface S37 and image side surface S38 are spherical surfaces. The fifth lens L35 is a biconvex lens and made of glass material, wherein both of the object side surface S38 and image side surface S39 are spherical surfaces. The sixth lens L36 is a meniscus lens and made of glass material, wherein the object side surface S311 is a concave surface, the image side surface S312 is a convex surface and both of the object side surface S311 and image side surface S312 are spherical surfaces. The seventh lens L37 is a biconcave lens and made of glass material, wherein both of the object side surface S312 and image side surface S313 are spherical surfaces. The eighth lens L38 is a biconvex lens and made of glass material, wherein both of the object side surface S314 and image side surface S315 are spherical surfaces. The ninth lens L39 is a biconvex lens and made of glass material, wherein both of the object side surface S316 and image side surface S317 are aspheric surfaces. The fourth lens L34 and the fifth lens L35 are cemented together to form a cemented lens. The sixth lens L36 and the seventh lens L37 are cemented together to form a cemented lens. Both of the object side surface S318 and image side surface S319 of the optical filter OF3 are plane surfaces. Both of the object side surface S320 and image side surface S321 of the cover glass CG3 are plane surfaces.

In order to maintain excellent optical performance of the wide-angle lens in accordance with the third embodiment of the invention, the wide-angle lens 3 must satisfies the following eight conditions:

$$-26 < f3_1/f3 < f3_2/f3 < f3_3/f3 < -3 \quad (17)$$

$$-1.64 < f3_{123}/f3 < -1.6 \quad (18)$$

$$30 < D3/D3_{89} < 271 \quad (19)$$

$$-226 < R3_{41}/f3 < 19 \quad (20)$$

$$-63 < R3_{61}/f3 < 7 \quad (21)$$

$$4.2 < f3_9/f3 < 5.6 \quad (22)$$

$$-16 < f3/f3_{56} < 254 \quad (23)$$

$$-0.7 < f3_{6789}/f3_{12345} < 0.8 \quad (24)$$

wherein $f3_1$ is an effective focal length of the first lens L31, $f3_2$ is an effective focal length of the second lens L32, $f3_3$ is an effective focal length of the third lens L33, $f3$ is an effective focal length of the wide-angle lens 3, $f3_{123}$ is an effective focal length of the combination of the first lens L31, the second lens L32 and the third lens L33, D3 is an interval between the object side surface S31 of the first lens L31 and the image plane IMA3 along the optical axis OA3, $D3_{89}$ is an interval between the image side surface S315 of the eighth lens L38 and the object side surface S316 of the ninth lens L39 along the optical axis OA3, $R3_{41}$ is a radius of curvature of the object side surface S37 of the fourth lens L34, $R3_{61}$ is a radius of curvature of the object side surface S311 of the sixth lens L36, $f3_9$ is an effective focal length of the ninth lens L39, $f3_{78}$ is an effective focal length of the combination of the seventh lens L37 and the eighth lens L38, $f3_{56}$ is an effective focal length of the combination of the fifth lens L35 and the sixth lens L36, $f3_{12345}$ is an effective focal length of the combination of the first lens L31, the second lens L32, the third lens L33, the fourth lens L34 and the fifth lens L35, and $f3_{6789}$ is an effective focal length of the combination of the sixth lens L36, the seventh lens L37, the eighth lens L38 and the ninth lens L39.

By the above design of the lenses and the aperture ST3, the wide-angle lens 3 is provided with a shortened total lens length, an increased field of view and an effective corrected aberration.

In order to achieve the above purposes and effectively enhance the optical performance, the wide-angle lens 3 in accordance with the third embodiment of the invention is provided with the optical specifications shown in Table 5, which include the effective focal length, field of view, radius of curvature of each lens surface, thickness between adjacent surface, refractive index of each lens and Abbe number of each lens. Table 5 shows that the effective focal length is equal to 0.8054 mm and F-number is equal to 2.8 for the wide-angle lens 3 of the third embodiment of the invention.

interval $D3_{89}$ between the image side surface S315 of the eighth lens L38 and the object side surface S316 of the ninth lens L39 along the optical axis OA3 is equal to 0.8982 mm, the radius of curvature $R3_{41}$ of the object side surface S37 of the fourth lens L34 is equal to 14.6146 mm, the radius of curvature $R3_{61}$ of the object side surface S311 of the sixth lens L36 is equal to 50.0000 mm, the effective focal length $f3_9$ of the ninth lens L39 is equal to 3.7687 mm, the effective focal length $f3_{78}$ of the combination of the seventh lens L37 and the eighth lens L38 is equal to 6.4432 mm, the effective

TABLE 5

Effective Focal Length = 0.8054 mm F-number = 2.8

| Surface Number | Radius of Curvature (mm) | Thickness (mm) | Nd | Vd | Remark |
| --- | --- | --- | --- | --- | --- |
| S31 | 19.31827 | 3.590254 | 1.834 | 37.160487 | The First Lens L31 |
| S32 | 8.199993 | 2.999932 | | | |
| S33 | 14.18683 | 1.142584 | 1.743299 | 49.221606 | The Second Lens L32 |
| S34 | 4.747653 | 1.98049 | | | |
| S35 | 10.5936 | 2.001565 | 1.743299 | 49.221606 | The Third Lens L33 |
| S36 | 1.518124 | 1.400966 | | | |
| S37 | 14.61463 | 0.4999947 | 1.696797 | 55.532241 | The Fourth Lens L34 |
| S38 | 2.725911 | 4.996861 | 1.84666 | 23.77794 | The Fifth Lens L35 |
| S39 | −4.690879 | 0.1326738 | | | |
| S310 | ∞ | 0.1373505 | | | Aperture ST3 |
| S311 | −50.00004 | 1.17864 | 1.696797 | 55.532241 | The Sixth Lens L36 |
| S312 | −1.807204 | 0.5167029 | 1.84666 | 23.77794 | The Seventh Lens L37 |
| S313 | 15.27071 | 0.09996228 | | | |
| S314 | 4.808219 | 2.034078 | 1.58913 | 61.135024 | The Eighth Lens L38 |
| S315 | −8.122065 | 0.8981988 | | | Interval $D3_{89}$ |
| S316 | 4.04169 | 2.092175 | 1.58913 | 61.135024 | The Ninth Lens L39 |
| S317 | −3.981513 | 0.2 | | | |
| S318 | ∞ | 0.3 | 1.5168 | 64.167336 | Optical Filter OF3 |
| S319 | ∞ | 0.948 | | | |
| S320 | ∞ | 0.5 | 1.5168 | 64.167336 | Cover Glass CG3 |
| S321 | ∞ | 0.151991 | | | |

The aspheric surface sag z of each lens in table 5 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}$$

where c is curvature, h is the vertical distance from the lens surface to the optical axis, k is conic constant and A, B, C, D, E and F are aspheric coefficients.

In the third embodiment, the conic constant k and the aspheric coefficients A, B, C, D, E, F of each surface are shown in Table 6.

TABLE 6

| Surface Number | k | A | B | C | D | E | F |
| --- | --- | --- | --- | --- | --- | --- | --- |
| S35 | 1.899669 | −0.000269805 | −0.000121194 | 3.65E−06 | 1.39E−07 | −6.78E−09 | 0 |
| S36 | −0.9248761 | 0.003237759 | −0.000167584 | 0 | 4.03E−05 | 0 | 0 |
| S316 | −0.9840762 | −0.000370541 | 9.57E−05 | 3.43E−05 | −6.13E−06 | 0 | 0 |
| S317 | −8.476654 | 0.00523031 | 0.000313991 | 0 | 0 | 0 | 0 |

For the wide-angle lens 3 of the third embodiment, the effective focal length $f3_1$ of the first lens L31 is equal to 20.0225 mm, the effective focal length $f3_2$ of the second lens L32 is equal to 10.1217 mm, the effective focal length $f3_3$ of the third lens L33 is equal to 2.6314 mm, the effective focal length f3 of the wide-angle lens 3 is equal to 0.8054 mm, the effective focal length $f3_{123}$ of the combination of the first lens L31, the second lens L32 and the third lens L33 is equal to 1.2912 mm, the interval D3 between the object side surface S31 of the first lens L31 and the image plane IMA3 along the optical axis OA3 is equal to 27.8024 mm, the focal length $f3_{56}$ of the combination of the fifth lens L35 and the sixth lens L36 is equal to 4.3457 mm, the effective focal length $f3_{12345}$ of the combination of the first lens L31, the second lens L32, the third lens L33, the fourth lens L34 and the fifth lens L35 is equal to 4.2520 mm, and the effective focal length $f3_{6789}$ of the combination of the sixth lens L36, the seventh lens L37, the eighth lens L38 and the ninth lens L39 is equal to 3.1448 mm. According to the above data, the following values can be obtained:

$f3_1/f3=-24.8601$, $f3_2/f3=-12.5672$ $f3_3/f3=-3.2671$ $f3_{123}/f3=-1.6031$, $D3/D3_{89}=30.9535$, $R3_{41}/f3=18.1456$, $R3_{61}/f3=-62.0803$, $f_{39}/f_3 = 4.6792$, $f_{378}/f_{356} = 1.4826$, $f_{36789}/f_{312345} = 0.7396$, which respectively satisfy the above conditions (17)-(24).

Figure 6B:
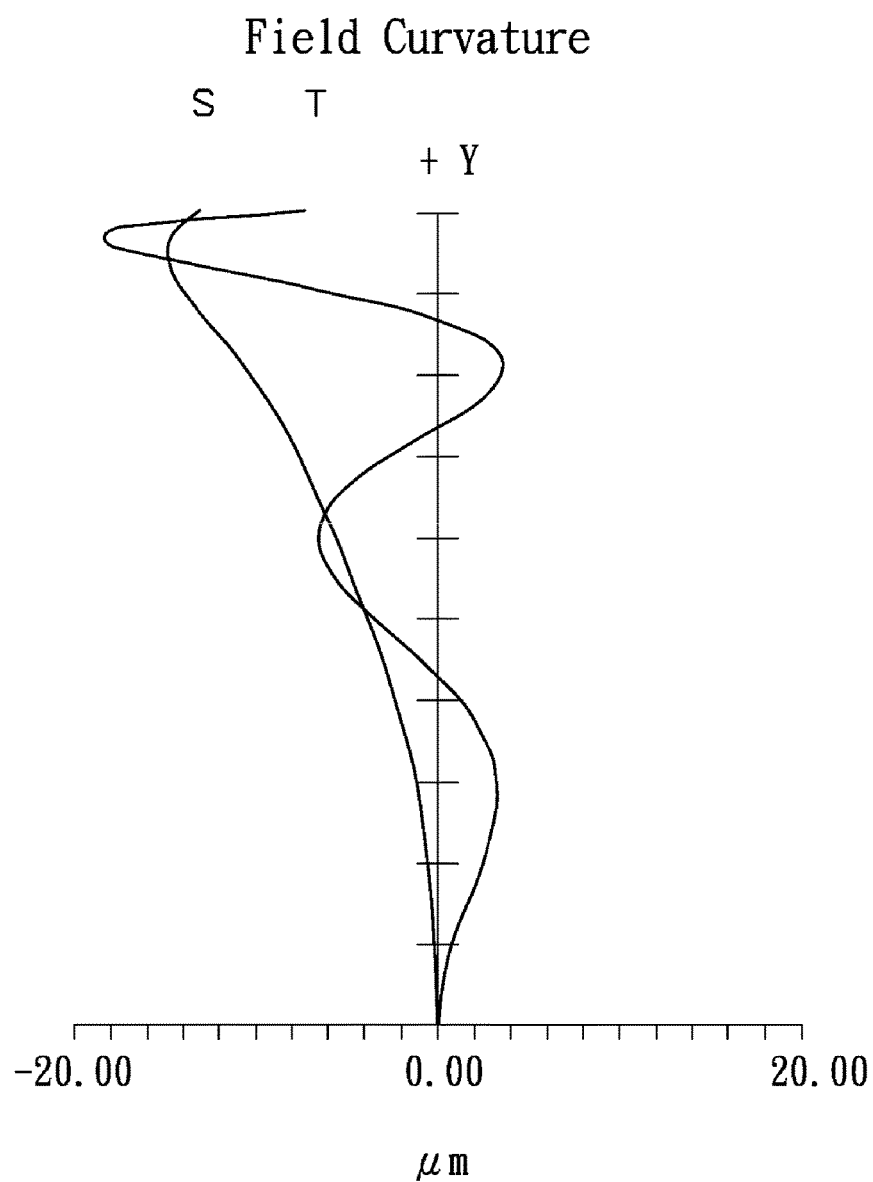
FIG. 6B is a field curvature diagram of the wide-angle lens in accordance with the third embodiment of the invention.
Figure 6C:
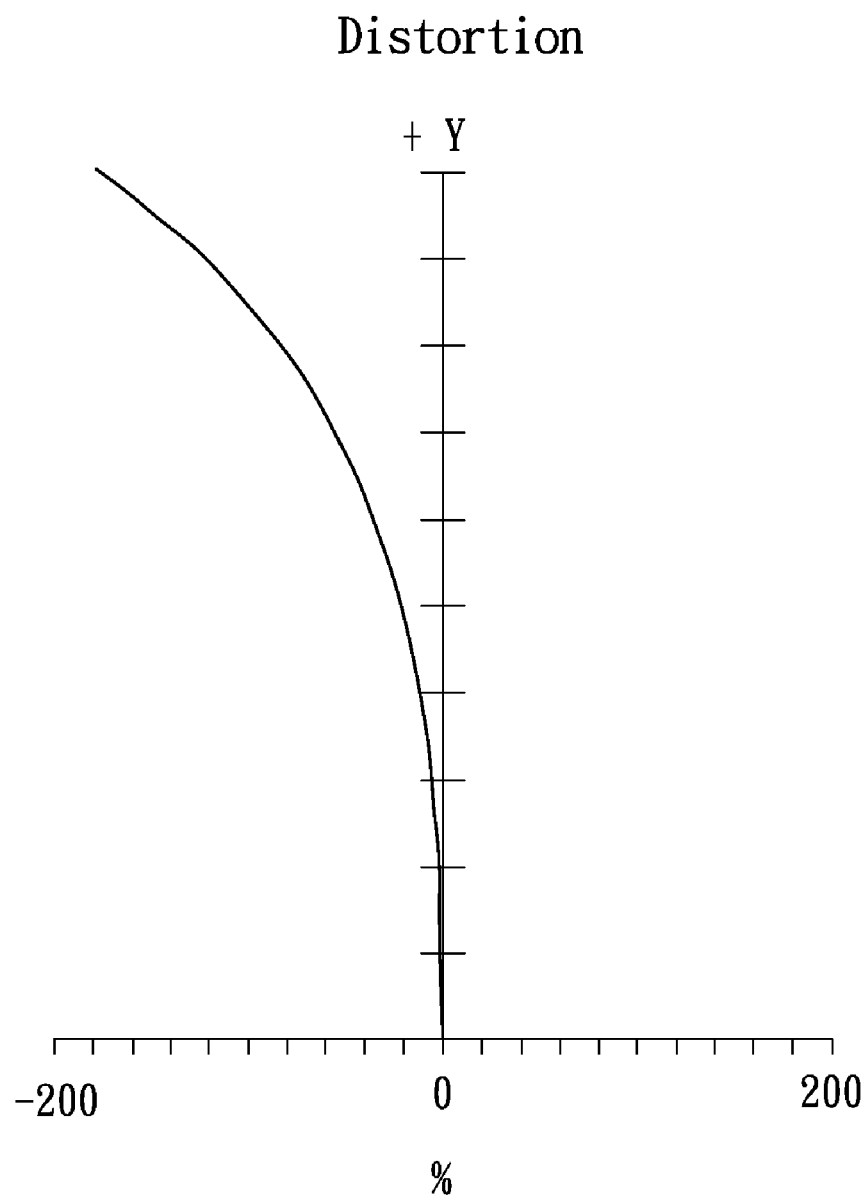
FIG. 6C is a distortion diagram of the wide-angle lens in accordance with the third embodiment of the invention.
Figure 6D:
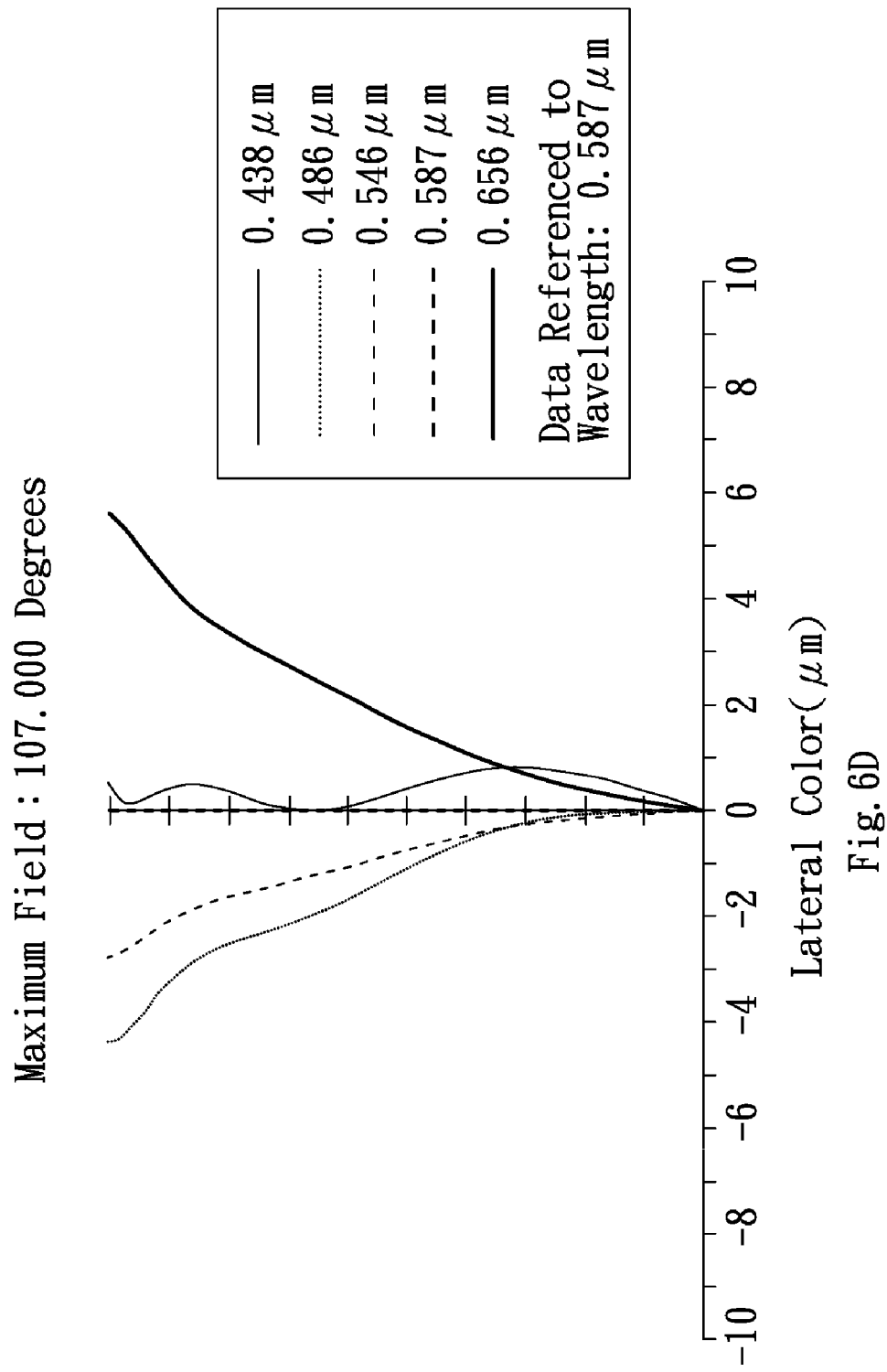
FIG. 6D is a lateral color diagram of the wide-angle lens in accordance with the third embodiment of the invention.
Figure 6E:
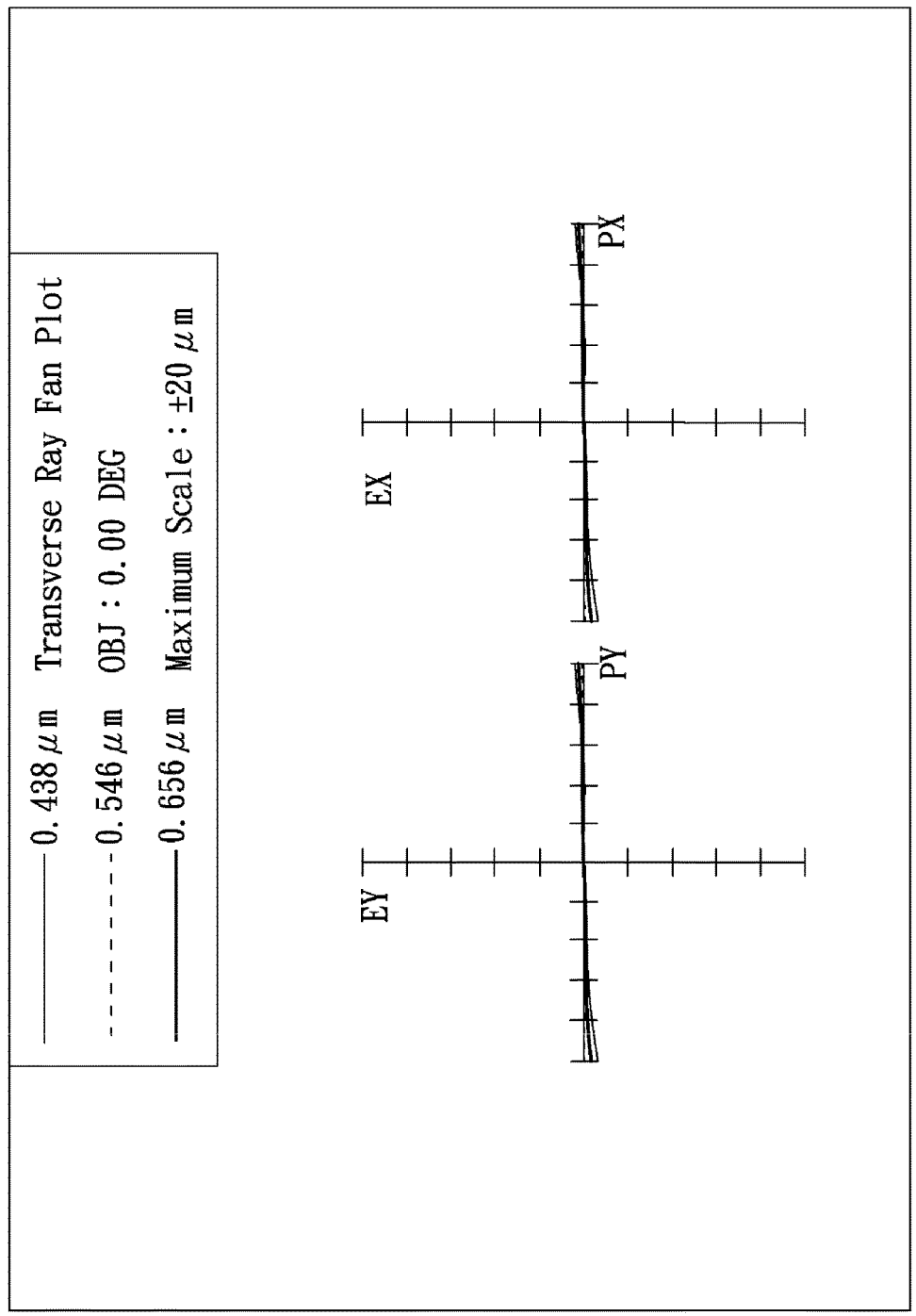
Figure 6G:
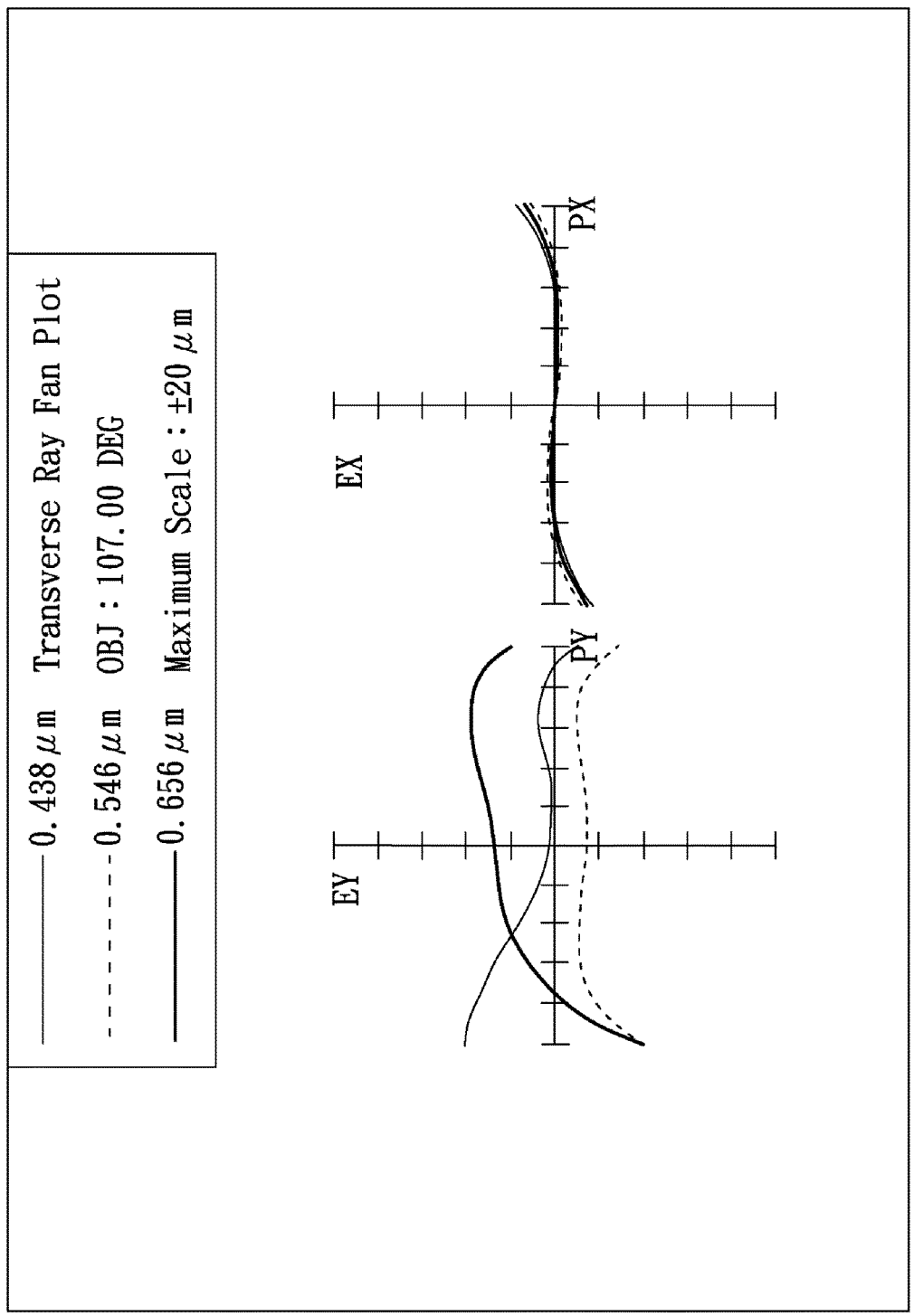

By the above arrangements of the lenses and the aperture ST3, the wide-angle lens 3 of the third embodiment can meet the requirements of optical performance as seen in FIGS. 6A-6G, wherein FIG. 6A shows the longitudinal aberration diagram of the wide-angle lens 3 in accordance with the third embodiment of the invention, FIG. 6B shows the field curvature diagram of the wide-angle lens 3 in accordance with the third embodiment of the invention, FIG. 6C shows the distortion diagram of the wide-angle lens 3 in accordance with the third embodiment of the invention, FIG. 6D shows the lateral color diagram of the wide-angle lens 3 in accordance with the third embodiment of the invention and FIGS. 6E-6G show the transverse ray fan diagrams of the wide-angle lens 3 in accordance with the third embodiment of the invention.

It can be seen from FIG. 6A that the longitudinal aberration in the wide-angle lens 3 of the third embodiment ranges from 0.001 mm to 0.006 mm for the wavelength of 0.438 µm, 0.486 µm, 0.546 µm, 0.587 µm and 0.656 µm. It can be seen from FIG. 6B that the field curvature of tangential direction and sagittal direction in the wide-angle lens 3 of the third embodiment ranges from 20 µm to 4 µm for the wavelength of 0.546 µm. It can be seen from FIG. 6C that the distortion in the wide-angle lens 3 of the third embodiment ranges from 200% to 0% for the wavelength of 0.546 µm. It can be seen from FIG. 6D that the lateral color with reference wavelength of 0.587 µm in the wide-angle lens 3 of the third embodiment ranges from 5 µm to 6 µm for the wavelength of 0.438 µm, 0.486 µm, 0.546 µm, 0.587 µm and 0.656 µm, with field ranged from 0 degrees to 107 degrees. It can be seen from FIGS. 6E-6G that the transverse ray aberration in the wide-angle lens 3 of the third embodiment ranges from 8.0 µm to 8.5 µm wherein the wavelength is 0.438 µm, 0.546 µm and 0.656 µm for field of 0.00 degrees, 75.00 degrees and 107.00 degrees, respectively. It is obvious that the longitudinal aberration, the field curvature, the distortion, the lateral color and the transverse ray aberration of the wide-angle lens 3 of the third embodiment can be corrected effectively. Therefore, the wide-angle lens 3 of the third embodiment is capable of good optical performance.

What is claimed is:

1. A wide-angle lens, from an object side to an image side along an optical axis, the wide-angle lens comprising:
    a first lens with negative refractive power;
    a second lens with negative refractive power;
    a third lens with negative refractive power;
    a fourth lens with refractive power;
    a fifth lens with refractive power;
    a sixth lens with refractive power;
    a seventh lens with refractive power;
    an eighth lens being a biconvex lens with positive refractive power; and
    a ninth lens being a biconvex lens with positive refractive power,
    wherein the first lens, the second lens, the third lens and the fourth lens satisfy the following conditions:

$-26 < f_1/f \le f_2/f \le f_3/f < -3$, and $-226 < R_{41}/f < 19$ wherein $f_1$ is an effective focal length of the first lens, $f_2$ is an effective focal length of the second lens, $f_3$ is an effective focal length of the third lens, f is an effective focal length of the wide-angle lens, and $R_{41}$ is a radius of curvature of an object side surface of the fourth lens.

2. The wide-angle lens as claimed in claim 1, wherein the eighth lens and the ninth lens satisfy the following conditions:

$30 < D/D_{89} < 271$, wherein D is an interval between an object side surface of the first lens and an image plane along the optical axis, and $D_{89}$ is an interval between an image side surface of the eighth lens and an object side surface of the ninth lens along the optical axis.

3. The wide-angle lens as claimed in claim 1, wherein the first lens, the second lens and the third lens satisfy the following conditions:

$-1.64 < f_{123}/f < -1.6$, wherein $f_{123}$ is an effective focal length of a combination of the first lens, the second lens and the third lens, and f is an effective focal length of the wide-angle lens.

4. The wide-angle lens as claimed in claim 1, wherein the sixth lens satisfies the following conditions:

$-63 < R_{61}/f < 7$, wherein $R_{61}$ is a radius of curvature of an object side surface of the sixth lens and f is an effective focal length of the wide-angle lens.

5. The wide-angle lens as claimed in claim 1, wherein the ninth lens satisfies the following conditions:

$4.2 < f_9/f < 5.6$, wherein $f_9$ is an effective focal length of the ninth lens and f is an effective focal length of the wide-angle lens.

6. The wide-angle lens as claimed in claim 1, wherein the fifth lens, the sixth lens, the seventh lens and the eighth lens satisfy the following conditions:

$-16 < f_{78}/f_{56} < 254$, wherein $f_{78}$ is an effective focal length of a combination of the seventh lens and the eighth lens, and $f_{56}$ is an effective focal length of a combination of the fifth lens and the sixth lens.

7. The wide-angle lens as claimed in claim 1, wherein the wide-angle lens satisfies the following conditions:

$-0.7 < f_{6789}/f_{12345} < 0.8$, wherein $f_{12345}$ is an effective focal length of a combination of the first lens, the second lens, the third lens, the fourth lens and the fifth lens, and $f_{6789}$ is an effective focal length of a combination of the sixth lens, the seventh lens, the eighth lens and the ninth lens.

8. The wide-angle lens as claimed in claim 1, wherein the fourth lens and the fifth lens forms a first cemented lens, and the sixth lens and the seventh lens are forms a second cemented lens.

9. The wide-angle lens as claimed in claim 8, further comprising an aperture disposed between the fifth lens and the sixth lens.

10. The wide-angle lens as claimed in claim 1, further comprising an aperture disposed between the fourth lens and the seventh lens.

11. The wide-angle lens as claimed in claim 1, wherein the fourth lens is with negative refractive power, the fifth lens is with positive refractive power, the sixth lens is with positive refractive power, and the seventh lens is with negative refractive power.

12. The wide-angle lens as claimed in claim 1, wherein at least one surface of the second lens is an aspheric surface.

13. The wide-angle lens as claimed in claim 1, wherein at least one surface of the third lens is an aspheric surface.

14. The wide-angle lens as claimed in claim 1, wherein at least one surface of the ninth lens is an aspheric surface.

15. The wide-angle lens as claimed in claim 1, wherein the second lens is made of glass material.

16. The wide-angle lens as claimed in claim 1, wherein the third lens is made of glass material.

17. The wide-angle lens as claimed in claim 1, wherein the ninth lens is made of glass material.

18. The wide-angle lens as claimed in claim 1, further comprising an optical filter disposed between the ninth lens and an image plane.

19. A wide-angle lens, from an object side to an image side along an optical axis, the wide-angle lens comprising:
    a first lens with negative refractive power;
    a second lens with negative refractive power;
    a third lens with negative refractive power;
    a fourth lens with refractive power;
    a fifth lens with refractive power;
    a sixth lens with refractive power;
    a seventh lens with refractive power;
    an eighth lens being a biconvex lens with positive refractive power; and
    a ninth lens being a biconvex lens with positive refractive power,
    wherein the wide-angle lens satisfies the following conditions:

$-26 < f_1/f < f_2/f < f_3/f < -3$, and $-0.7 < f_{6789}/f_{12345} < 0.8$ wherein $f_1$ is an effective focal length of the first lens, $f_2$ is an effective focal length of the second lens, $f_3$ is an effective focal length of the third lens, f is an effective focal length of the wide-angle lens, $f_{12345}$ is an effective focal length of a combination of the first lens, the second lens, the third lens, the fourth lens and the fifth lens, and $f_{6789}$ is an effective focal length of a combination of the sixth lens, the seventh lens, the eighth lens and the ninth lens.

20. A wide-angle lens, from an object side to an image side along an optical axis, the wide-angle lens comprising:
    a first lens with negative refractive power;
    a second lens with negative refractive power;
    a third lens with negative refractive power;
    a fourth lens with refractive power;
    a fifth lens with refractive power;
    a sixth lens with refractive power;
    a seventh lens with refractive power;
    an eighth lens being a biconvex lens with positive refractive power; and
    a ninth lens being a biconvex lens with positive refractive power,
    wherein the wide-angle lens satisfies the following conditions:

$-26 < f_1/f < f_2/f < f_3/f < -3$, and $-63 < R_{61}/f < 7$ wherein $f_1$ is an effective focal length of the first lens, $f_2$ is an effective focal length of the second lens, $f_3$ is an effective focal length of the third lens, f is an effective focal length of the wide-angle lens and $R_{61}$ is a radius of curvature of an object side surface of the sixth lens.

* * * * *